US007740093B2

(12) United States Patent
Abe et al.

(10) Patent No.: US 7,740,093 B2
(45) Date of Patent: Jun. 22, 2010

(54) POWER PLANT WITH PLANETARY GEAR TRAIN

(75) Inventors: Noriyuki Abe, Saitama-ken (JP); Shigemitsu Akutsu, Saitama-ken (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 209 days.

(21) Appl. No.: 11/976,264

(22) Filed: Oct. 23, 2007

(65) Prior Publication Data

US 2008/0099260 A1 May 1, 2008

(30) Foreign Application Priority Data

Oct. 25, 2006 (JP) .............................. 2006-290120

(51) Int. Cl.
*B60K 1/00* (2006.01)
(52) U.S. Cl. .................... 180/65.6; 180/65.7; 477/108
(58) Field of Classification Search ............. 180/65.25, 180/65.27, 65.28, 65.6, 65.225, 65.7; 903/910, 903/918; 477/3, 118, 108, 42; 475/211, 475/219, 210
See application file for complete search history.

(56) References Cited

U.S. PATENT DOCUMENTS

| | | | |
|---|---|---|---|
| 3,340,749 A * | 9/1967 | Schreiner et al. ............ 475/211 |
| 4,599,916 A * | 7/1986 | Hirosawa .................... 475/210 |
| 4,624,153 A * | 11/1986 | Itoh et al. .................... 475/211 |
| 4,864,889 A * | 9/1989 | Sakakibara et al. ......... 475/211 |
| 6,524,217 B1 * | 2/2003 | Murakami et al. ........ 180/65.27 |
| 6,736,753 B2 * | 5/2004 | Endo et al. ..................... 477/3 |
| 6,902,512 B2 * | 6/2005 | Kamichi et al. ............. 477/108 |
| 7,246,672 B2 * | 7/2007 | Shirai et al. .............. 180/65.25 |
| 2006/0247086 A1 | 11/2006 | Watanabe et al. |

* cited by examiner

*Primary Examiner*—Hau V Phan
(74) *Attorney, Agent, or Firm*—Squire, Sanders & Dempsey, LLP

(57) ABSTRACT

To provide a power plant which is capable of improving the drive efficiency and power generation efficiency when electric power is generated using power of the drive part thereof.

In a power plant (1), an output shaft (3a) of an internal combustion engine (3) is connected to driven parts DW and DW, and a transmission (20) is connected between the output shaft (3a) of the engine (3) and the driven parts DW and DW, while one of first to third elements (31), (32), and (34) of a planetary gear train (30) is connected between the output shaft (3a) of the engine (3) and the transmission (20), another one of the first to third elements to the output portion (42) of the generator-motor (40), and the remaining one of the same to the driven parts DW and DW.

17 Claims, 18 Drawing Sheets

FIG. 6
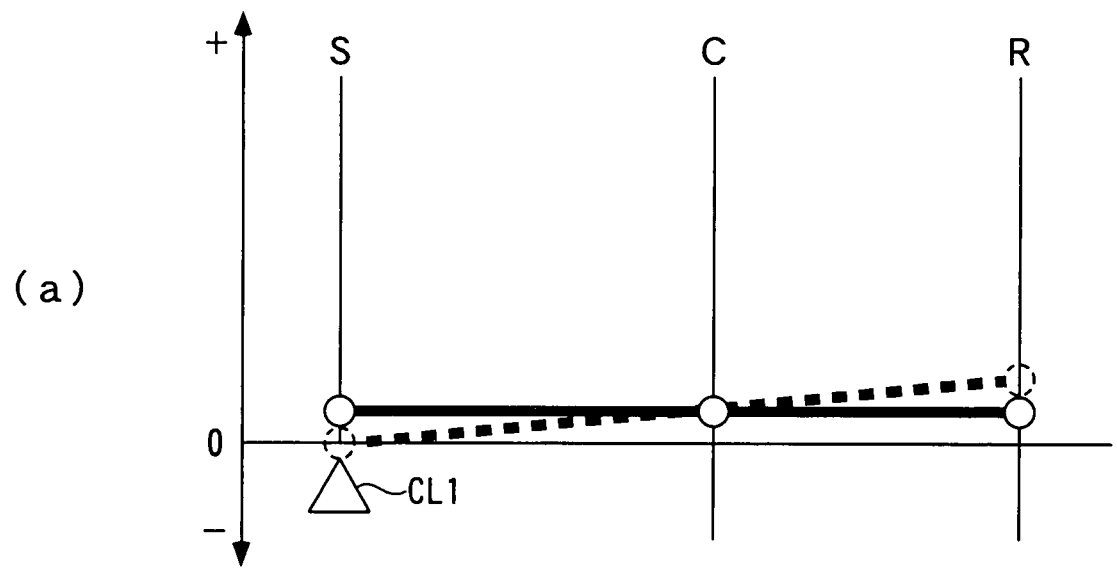
(a)
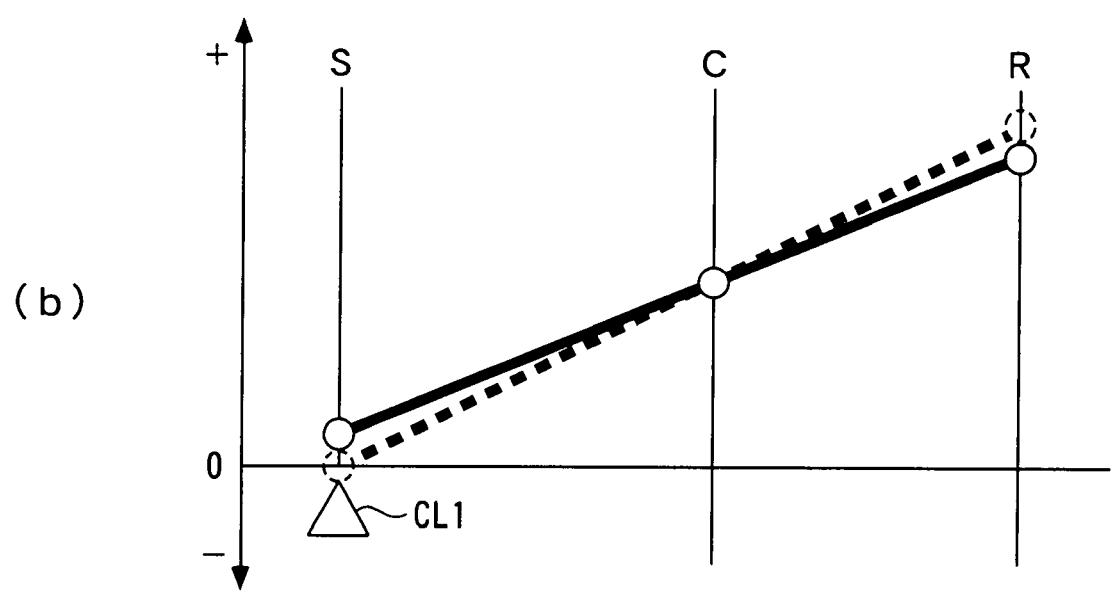
(b)

F I G. 1 5
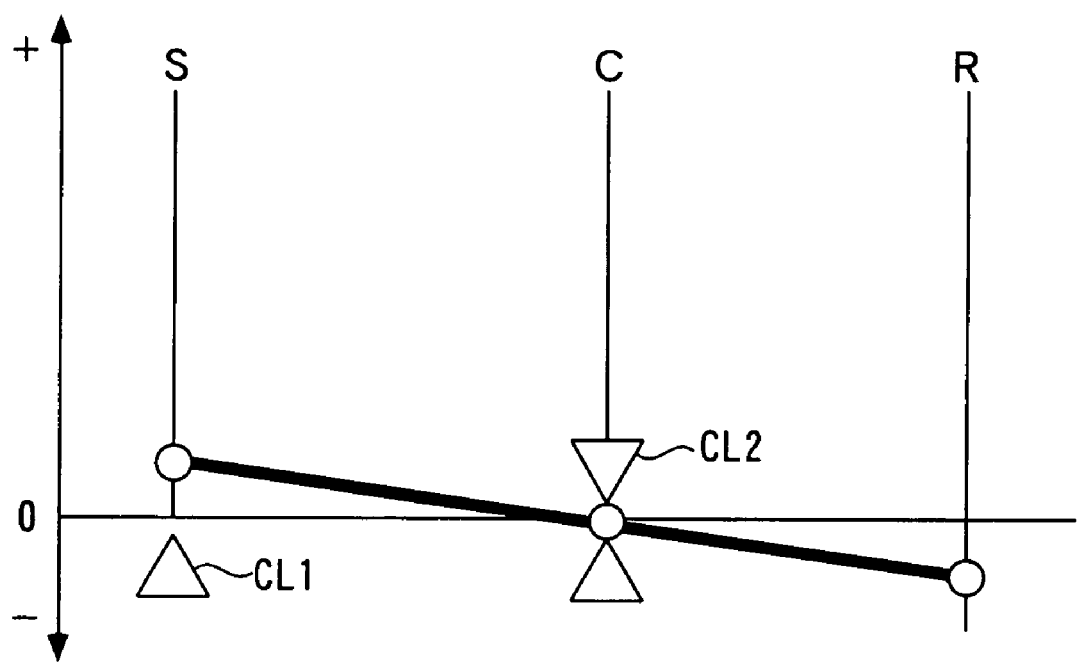

F I G. 1 7
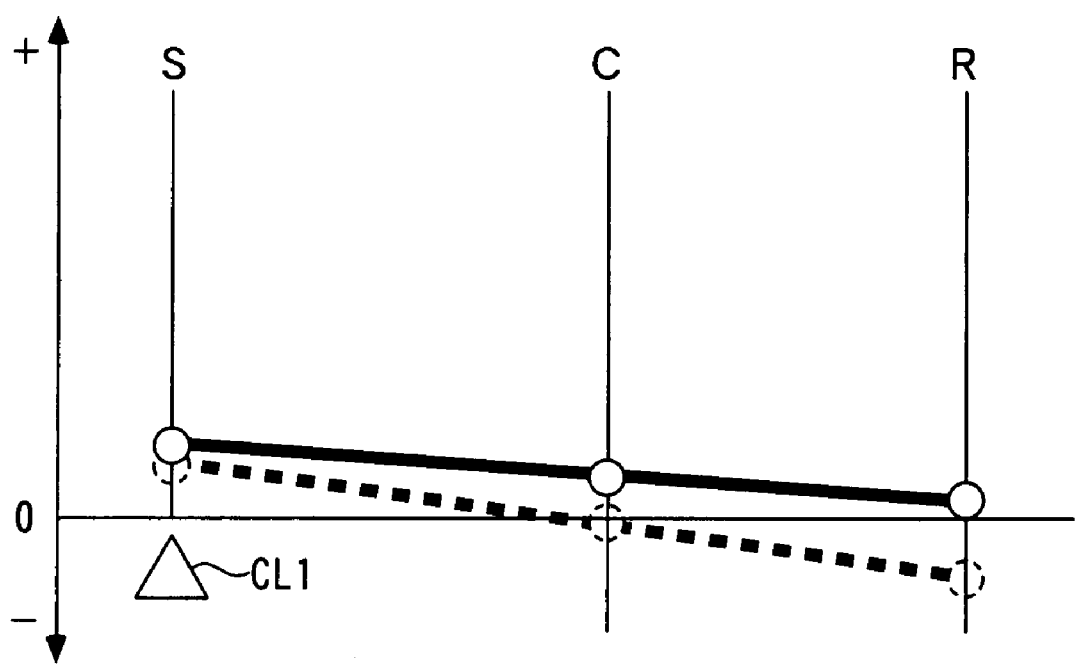

POWER PLANT WITH PLANETARY GEAR TRAIN

FIELD OF THE INVENTION

The present invention relates to a power plant for driving a driven part, and more particularly to a power plant including an internal combustion engine and a generator-motor as power sources.

BACKGROUND ART

Conventionally, as the power plant of this kind, one disclosed in Patent Literature 1 is known. This power plant is for driving drive wheels of a vehicle, and is equipped with an internal combustion engine and a generator-motor as power sources, and a stepless transmission and a planetary gear train for transmitting power to the drive wheels. The planetary gear train is a general single pinion type that has a sun gear, a ring gear, and a carrier, and the sun gear and the ring gear are connected to the drive wheels via a high clutch and a low clutch, respectively. The engine is connected to the carrier via a main shaft, and the main shaft is connected to an input pulley of the stepless transmission. Further, the generator-motor, the output pulley of the stepless transmission, and the sun gear are connected to each other via an auxiliary shaft.

The power plant configured as above has operation modes one of which is a torque circulation mode mainly used during low-speed traveling. In the torque circulation mode, the aforementioned high clutch is disengaged to thereby disconnect between the sun gear and the drive wheels, and the low clutch is engaged to connect between the ring gear and the drive wheels. This causes the torque of the generator-motor to be transmitted to the carrier via the auxiliary shaft, the stepless transmission, and the main shaft. Further, the torque transmitted to the carrier is distributed between the ring gear and the sun gear, and torque distributed to the ring gear is transmitted to the drive wheels. On the other hand, torque distributed to the sun gear is transmitted to the auxiliary shaft, and after being combined with the torque of the generator-motor, it is transmitted to the carrier via the stepless transmission and the main shaft. As described above, in the torque circulation mode, the power of the generator-motor is transmitted to the drive wheels while circulating through the stepless transmission and the planetary gear train.

As described above, in the conventional power plant, since during operation in the torque circulation mode, the transmission of power from the generator-motor to the drive wheels is carried out necessarily via the stepless transmission, and hence due to power transmission loss at the stepless transmission, the drive efficiency of the power plant is reduced. Further, for example, during the operation in the torque circulation mode, also when electric power is generated by the generator-motor using the power of the drive wheels, the transmission of power from the drive wheels to the generator-motor is performed via the stepless transmission, and hence it is impossible to obtain a sufficient power generation efficiency due to power transmission losses at the stepless transmission.

The present invention has been made to provide a solution to the above-described problems, and an object thereof is to provide a power plant which is capable of improving the drive efficiency and the power generation efficiency thereof when the electric power is generated using the power of the driven part.

[Patent Literature 1] Japanese Laid-Open Patent Publication (Kokai) No. 2004-175320.

DISCLOSURE OF THE INVENTION

Means for Solving the Problems

To attain the object, the invention as claimed in claim 1 provides a power plant 1 for driving a driven part (drive wheels DW and DW in the embodiment (the same applies hereinafter in this section)), comprising an internal combustion engine 3 having an output shaft (crankshaft 3a), the output shaft connected to the driven part, a transmission (stepless transmission 20) connected between the output shaft of the engine 3 and the driven part, for changing speed of power of the engine 3 and transmitting the power to the driven part, a generator-motor 40 having an output portion (rotor 42), a planetary gear train 30 having first to third elements (sun gear 31, ring gear 32, carrier 34), one of the first to third elements being connected between the output shaft of the engine 3 and the transmission, another of the first to third elements being connected to the output portion of the generator-motor 40, a remaining one of the first to third elements being connected to the driven part.

According to this power plant, the engine is connected to the driven part via the transmission, while one of the first to third elements (hereinafter referred to as "the three elements") of the planetary gear train is connected between engine and the transmission, another one of the three elements to the generator-motor, and the remaining one of the same to the driven part. Thus, the generator-motor and the driven part are connected to each other via the other and the one of the three elements, and the transmission (hereinafter referred to as "the first path"), and via the other one and the remaining one of the three elements (hereinafter referred to as "the second path"). Thus, as the path for connecting the generator-motor and the driven part, the power plant has, in addition to the first path including the transmission, the second path which does not include the transmission. Therefore, compared with the above-described conventional case in which the power transmission between the generator-motor and the driven part necessarily via the transmission, it is possible to suppress power transmission loss at the transmission. Therefore, it is possible to increases the drive efficiency of driving the driven part by the generator-motor, and the power generation efficiency using power of the driven part by the generator-motor.

The invention as claimed claim 2 is the power plant 1 as claimed in claim 1, wherein the transmission is formed by a stepless transmission 20 that steplessly changes a transmission ratio.

As described above, the engine is connected to the drive part via the one of the three elements and the transmission, and the generator-motor is connected to the other one of the three elements and the drive part. In short, the engine, the generator-motor, the transmission, and the driven part are connected to each other. With this arrangement, since the stepless transmission is used as the transmission, it is possible to change the ratio of the rotational speed of the engine to that of the driven part and the ratio of the rotational speed of the generator-motor to that of the driven part, whereby it is possible to drive the driven part while controlling the outputs form the engine and the generator-motor such that excellent efficiencies of the engine and the generator-motor can be obtained. Therefore, it is possible to increase the drive efficiency of the power plant as a whole.

The invention as claimed claim 3 is the power plant 1 as claimed in claim 1 or 2, further comprises a clutch CL3 for connecting and disconnecting between the one of the first to third elements and the driven part.

With this arrangement, the connection between the one of the three elements connected between the engine and the transmission and the driven part is broken by the clutch, whereby the aforementioned first path including the transmission is cut off. As a consequence, the power transmission between the generator-motor and the driven part can be carried out only via the aforementioned second path, i.e. completely without by way of the transmission. Therefore, it is possible to completely prevent power transmission loss at the stepless transmission, and further increase the drive efficiency and the power generation efficiency of the generator-motor.

The invention as claimed claim 4 is the power plant 1 as claimed in claim 1 or 2, the first element of the planetary gear train 30 is formed by a sun gear 31, the third element being formed by a ring gear 32, and the second element being formed by a carrier 34 that rotatably supports planetary gears 33 in mesh with the sun gear 31 and the ring gear 32, wherein the one of the sun gear 31 and the ring gear 32 is connected between the output shaft of the engine 3 and the transmission, the another of the sun gear 31 and the ring gear 32 being connected to the output portion of the generator-motor 40, and the carrier 34 is connected to the driven part.

With this arrangement, when the engine is assisted by the generator-motor, the torque of the engine and the torque of the generator-motor are transmitted to the driven part in the following manner: part of the torque of the engine transmitted to the transmission is extracted (hereinafter the torque extracted is referred to as "the extracted torque) such that the extracted torque is balanced with the torque transmitted to the carrier from the generator-motor via the other of the sun gear and the ring gear, and is transmitted to the carrier via the one of the sun gear and the ring gear. Thus, the combined torque formed by combining the torque of the generator-motor and the extracted torque is transmitted to the carrier, and the combined torque is transmitted to the driven part. Further, in addition to the combined torque, remaining torque formed by subtracting the extracted torque from the torque of the engine is also transmitted to the driven part. As a consequence, torque equal in magnitude to the sum of the torque of the engine and the generator-motor is transmitted to the driven part.

As described above, during assist by the generator-motor, power corresponding to the extracted torque can be transmitted to the driven part without by way of the transmission, and hence it is possible to suppress power transmission loss at the stepless transmission 20 to thereby increase the drive efficiency of the power plant in its entirety. Further, it is possible to reduce the torque transmitted to the transmission, by torque corresponding to the extracted torque, and hence, by employing a transmission adapted to the reduced transmission torque, it is possible to attain the high efficiency and reduced size of the transmission, which then makes it possible to attain further improvement of the drive efficiency of the power plant in its entirety, and the reduction of the size thereof.

The invention as claimed claim 5 is the power plant 1 as claimed in claim 4, further comprises a clutch CL3 for connecting and disconnecting between the one of the sun gear 31 and the ring gear 32 and the driven part.

With this arrangement, the connection between the one of the sun gear and the ring gear and the driven part is broken by the clutch, whereby a path formed by one of the sun gear and the ring gear, which connects between the generator-motor and the driven part, and the transmission can be cut off. As a consequence, the power transmission between the generator-motor and the driven part can be carried out only via the other of the sun gear and the ring gear, i.e. completely without by way of the transmission. Therefore, it is possible to completely prevent power transmission loss at the stepless transmission, and further increase the drive efficiency and the power generation efficiency of the generator-motor.

The invention as claimed claim 6 is the power plant 1 as claimed in claim 5, wherein the one of the sun gear 31 and the ring gear 32 includes a brake mechanism (one-way clutch CL1) for inhibiting or limiting rotation of the one of the sun gear 31 and the ring gear 32 in a direction reverse to a direction of rotation of the output shaft of the engine 3.

With this arrangement, the brake mechanism suppresses or inhibits the one of the sun gear and the ring gear connected to the engine from rotating in a direction reverse to the direction of rotation of the output shaft of the engine. In combination with this, the connection between the one of the sun gear and the ring gear and the driven part is broken by the aforementioned clutch, whereby the power of the generator-motor transmitted to the other of the sun gear and the ring gear one is transmitted using one of the gears as a fulcrum to the driven part via the carrier. Therefore, it is possible to properly drive the driven part by the power of the generator-motor while limiting or inhibiting the reverse rotation of the output shaft of the engine connected to the one of the sun gear and the ring gear.

The invention as claimed claim 7 is the power plant 1 as claimed in claim 5, further comprises a lock mechanism (electromagnetic brake CL2) for holding the carrier 34 unrotatable.

With this arrangement, it is possible to transmit the power of the generator-motor to the one of the sun gear and the ring gear using the carrier as a fulcrum, without driving the driven part, by holding the carrier unrotatable by the lock mechanism. Further, while the one of the sun gear and the ring gear is connected to the carrier held unrotatable, via the driven part, the output shaft of the engine can be rotated by the power of the generator-motor transmitted to the one of the two gears as described above, by disconnecting between the one of the sun gear and the ring gear and the driven part using the clutch. Further, in this case, by causing the output portion of the generator-motor to be rotated in a direction reverse to the direction of rotation of the output shaft of the engine, it is possible to rotate the output shaft of the engine in the normal direction. From the above, it is possible to start the engine by the generator-motor, without driving the driven part.

BEST MODE FOR CARRYING OUT THE INVENTION

The present invention will now be described in detail with reference to the drawings showing a preferred embodiment thereof. It should be noted that in the figures, hatching in portions illustrating cross-sections are omitted for convenience. FIG. 1 schematically shows power plant 1 according to the present embodiment. The power plant 1 is for driving drive wheels DW and DW (driven parts) of a vehicle (not shown), and includes an internal combustion engine 3 and a generator-motor 40 as power sources, a stepless transmission 20 for transmitting a driving force to the drive wheels DW and DW, a planetary gear train 30, a differential gear mechanism 9, and drive shafts 10 and 10.

The internal combustion engine (hereinafter referred to as "the engine") 3 is e.g. a gasoline engine, and has a crankshaft 3a (output shaft) to which is connected a first mains shaft 4 via a flywheel 5. The first main shaft 4 is supported by a bearing 4a such that it is rotatable concentrically with the crankshaft 3a. Further, the first main shaft 4 is provided with a one-way clutch CL1 (brake mechanism). The one-way clutch is configured to permit rotation of the first main shaft 4 only when it rotates in the same direction as the crankshaft 3a, but inhibits the first main shaft 4 from rotating in a direction reverse to that of the crankshaft 3a.

The stepless transmission 20 is a so-called belt type, and is comprised of a drive pulley 21, a driven pulley 22, a transmission belt 23, and a variable pulley width mechanism 24.

The drive pulley 21 has a DR movable part 21 and a DR fixed part 21b which are frustoconical and opposed to each other. The DR movable part 21a is mounted on the first main shaft 4 in a manner axially movable but unrotatable relative to the first main shaft 4. The DR fixed part 21b is fixed to the first main shaft 4. Further, the opposed surfaces of the DR movable part 21a and the DR fixed part 21b are formed as inclined surfaces, whereby a V-shaped belt groove is formed so as to receive the transmission belt 23 such that it extends therearound.

The driven pulley 22 is configured similarly to the drive pulley 21. More specifically, the driven pulley 22 has a DN movable part 22a and a DN fixed part 22b which are frustoconical and opposed to each other. The DN movable part 22a is mounted on an auxiliary shaft 7 in a manner axially movable but unrotatable relative to the auxiliary shaft 7. The DR fixed part 21b is fixed to the auxiliary shaft 7. The auxiliary shaft 7 is rotatably supported by a pair of bearings 7a and 7a, and extend parallel with the first main shaft 4. Further, the opposed surfaces of the DN movable part 22a and the DN fixed part 22b are formed as inclined surfaces, whereby a V-shaped belt groove is formed therebetween. The transmission belt 23 is made of metal, and extends around the two pulleys 21 and 22 in a state fitted in the respective belt grooves thereof.

The variable pulley width mechanism 23 changes the pulley widths of the two pulleys 21 and 22, to thereby change the effective diameters thereof. The variable pulley width mechanism 24 includes a DR oil chamber 24a and a DN oil chamber 24b which are respectively formed within the DR movable part 21a and the DN movable part 22a, and a DR electromagnetic valve 24c and a DN electromagnetic valve 24d which control respective oil pressures supplied from an oil pressure pump, not shown, to the oil chambers 24a and 24b. The electromagnetic valves 24c and 24d have its valve opening controlled by an ECU 2, referred to hereinafter (see FIG. 2)

With the arrangement described above, in the stepless transmission 20, the oil pressures supplied to the two oil chambers 24a and 24b are controlled by controlling the valve opening degrees of the two electromagnetic valves 24c and 24d by the ECU 2, whereby the two movable parts 21a and 22a are axially controlled, respectively. This steplessly changes the respective effective diameters of the two pulleys 21 and 22, to thereby steplessly or continuously change transmission ratio of the stepless transmission 20.

Further, the aforementioned auxiliary shaft 7 has a gear 7b fixed thereto, which is in mesh with a first idler gear 8a fixed to an idler shaft 8. The idler shaft 8 is rotatably supported on a pair of bearings 8d and 8d. Further, the idler shaft 8 has a second idler gear 8b fixed thereto, which is in mesh with a gear 9a of the differential gear mechanism 9. The differential gear mechanism 9 is connected to the drive wheels DW and DV via the drive shafts 10 and 10, respectively.

With the arrangement described above, the crankshaft 3a of the engine 3 is connected to the drive wheels DW and DW via the first main shaft 4, the stepless transmission 20, the auxiliary shaft 7, the gear 7b, the first idler gear 8a, the idler shaft 8, the second idler gear 8b, the gear 9a, the differential gear mechanism 9, and the drive shafts 10 and 10. Therefore, the power of the engine 3 is transmitted to the drive wheels DW and DW while having the speed thereof steplessly changed through the control of the stepless transmission. Hereinafter, a sequence of the components from the first main shaft 4 to the drive shafts 10 and 10 is referred to as "the first power transmission path" as deemed appropriate.

Further, a clutch CL 3 is provided between the driven pulley 22 of the auxiliary shaft 7 and gear 7b. The clutch C13 is of a friction multi-disc clutch, and the degree of engagement thereof is controlled by the ECU 2, whereby the connection between the stepless transmission 20 and the drive wheels DW and DW is established and cut off.

The planetary gear train 30 is comprised of a sun gear 31 (first element, second element and third element) integrally concentrically fitted on a main shaft 4, a ring gear 32 first element, second element and third element) which has a larger number of teeth than the sun gear 31, a plurality of (e.g. three) planetary gears 33 (two of which are shown) in mesh with the two gears 31 and 32, and a carrier 34 (first element, second element and third element) rotatably supporting the planetary gears 33. The carrier 34 is integrally concentrically fitted on a second main shaft 6. The second main shaft 6 is formed to be hollow, and is rotatably supported on a pair of bearings 6a and 6a. The first main shaft 4 is rotatably concentrically fitted in the second main shaft 6. With this arrangement, the carrier 34 is rotatable in unison with the second main shaft 6.

Further, the second main shaft 6 is provided with an electromagnetic brake CL2 (lock mechanism). The electromagnetic brake CL2 is turned on or off by the ECU 2, and unrotatably holds the second main shaft 6 when in the ON state, but permits the rotation thereof when in the OFF state. Further, the second main shaft 6 has a gear 6b fixed thereto which is in mesh with a third idler gear 8c fixed to the idler shaft 8. With this arrangement, the carrier 34 of the planetary gear train 30 is connected to the drive wheels DW and DW via the second main shaft 6, the gear 6b, the third idler gear 8c, the idler shaft 8, the second idler gear 8b, the gear 9a, the differential gear mechanism 9, and the drive shafts 10 and 10. Hereinafter, a sequence of components from the second main shaft 6 to the drive shafts 10 and 10 will be referred to as "the second power transmission path") as deemed appropriate.

The generator-motor 40 is a three-phase brushless DC motor, and is provided integrally with the planetary gear train 30. The generator-motor 40 has a stator 41 formed by 3n armatures 41a, a rotor 42 (output portion) disposed in a manner opposed to the stator 41. Each armature 41a is formed by a iron core 41b, and a coil 41c wound around the iron core 41b. The armatures 41a are fixed to a case CA and arranged at substantially equal intervals in the circumferential direction of the first main shaft 4. The 3n coils 41c form n sets of three-phase coils of U-phase coils, V-phase coils, and W-phase coils. Further, a battery 46 and the ECU 2 are connected to the armatures 41a via a PDU 45 (see FIG. 2), and the PDU 45 is comprises of electric circuits, including an inverter.

The rotor 42 has n permanent magnets arranged side by side in the circumferential direction of the first main shaft 4 at substantially equal intervals, with each adjacent two of the magnets 42a are different in polarity. Each permanent magnet 42a is mounted on the outer peripheral surface of the ring gear of the planetary gear train 30 via an annular fixing portion 42 formed e.g. of a soft magnetic material (e.g. iron). With this arrangement, the rotor 42 is rotatable in unison with the ring gear 32.

In the generator-motor 40 constructed as describe above, when electric power is supplied to the armatures 41 from the battery 46, the rotor 42 rotates, and at the same time, the ECU 2 controls the magnitude and frequency of electric current supplied to the armatures 41a, whereby the torque and rotational speed of the rotor 42 is controlled. Further, when the rotor 42 is rotated by an external force with power supply to the armatures 41a interrupted, the ECU 2 controls the PDU 45 whereby an induced electromotive force is generated in the armatures 41a to generate electric power.

Further, as shown in FIG. 2, a crank angle sensor detects the crank angle position of a crankshaft 3a of the engine 21, and delivers a signal indicative of the sensed crank angle position to an ECU 2, described hereinafter. The ECU 2 calculates the engine speed NE based on the crank angle position, Further, a DR pulley speed rotational speed sensor 52 and a DN pulley rotational speed sensor 53 delivers a detection signal indicative of a drive-side pulley rotational speed NDR as the rotational speed of the drive pulley 21 and a detection signal indicative of a driven-side pulley rotational speed as the rotational speed of the aforementioned driven pulley 32 to the ECU 2. The ECU 2 calculates the transmission ratio RATIO (=NDR/NDN) of the stepless transmission 20 based on the drive-side pulley rotational speed NDR and the driven-side pulley rotational speed NDN.

Further, a rotational angle position sensor 54 delivers detection signals indicative of rotational angle positions of the rotor 42 of the generator-motor 40 to the ECU 2. The ECU 2 calculates the rotational speed of the rotor 42 VR (hereinafter referred to as "rotor rotational speed") based on the detection signal. Further, a current-voltage sensor 55 delivers a detection signal indicative of current-voltage values input to and output from the battery 46 to the ECU 2. The ECU 2 calculates the remaining charge of the battery 46 based on the detection signal.

Further, an accelerator pedal opening sensor 56 deliver a detection signal indicative of an accelerator pedal opening AP as a stepped-on amount AP of an accelerator pedal, not shown, of the vehicle to the ECU 2, and a vehicle speed sensor 57 delivers a detection signal indicative of a vehicle speed VP to the ECU 2

The ECU 2 is implemented by a microcomputer comprised of a CPU, a RAM, a ROM, and an I/O interface, and controls the operation of the power plant 1 based on the detection signals from the aforementioned sensors 51 to 57.

Next, a description will be given of the control of the power plant 1 by the ECU 2 during the start and traveling of the vehicle. First, a description will be given of control during a creep operation and start of the vehicle. During the creep operation, the vehicle basically uses only the generator-motor 40 as a drive source thereof. By controlling the electromagnetic brake CL2 to the OFF state, the rotation of the second main shaft 6 and the carrier 34 integrally formed therewith is permitted, by disengaging the clutch CL3, the stepless transmission 20 is disconnected from the drive wheels DW and DW. Further, the ECU 2 controls the rotor 42 of the generator-motor 40 such that it rotates in the same direction as that of rotation of the crankshaft 3a, together with the ring gear 32.

As described hereinabove, the one-way clutch CL1 prevents the sun gear 31 from rotating together with the first main shaft 4 in a direction reverse to the direction of rotation of the crankshaft 3a. Therefore, the torque of the generator-motor 40 is transmitted using the sun gear 31 as a fulcrum, as shown in FIG. 3, to the carrier 34 via the ring gear 32 and the planetary gears 34, and then the torque is transmitted via the second power transmission path to the drive wheels DW and DW without by way of the stepless transmission 20. This causes the second rotor 33 to rotate in the same direction as the crankshaft 3a, whereby the drive wheels DW and DW rotate in the normal direction. Further, the torque of the generator-motor 40 is controlled such that the rotational speed of the carrier 34 becomes very small, whereby the creep operation with a very low vehicle speed VP is carried out. In FIG. 3 and other figures showing states of transmission of torque, referred to hereinafter, a thick broken line with an arrow indicates a flow of torque.

Further, from this state, the torque of the generator-motor 40 is increased to thereby increase the rotational speed of the ring gear 32 from a value of approximately 0 (indicated by broken lines in the figure, whereby the rotational speed of the carrier 34 increases to cause the vehicle to make a standing start. The FIG. 4 speed diagram shows the direction of rotation of the crankshaft 3a as the direction of normal rotation, and the sun gear 31, the carrier 34, and the ring gear 32 by "S", "C", and "R", respectively. This also applies to the other speed diagrams.

Further, after the start of the vehicle, the starting of the engine 3 is carried out in the following manner: The clutch CL3 is engaged to thereby connect between the driving wheels DW and DW and the stepless transmission 20. Accordingly, as shown in FIG. 5, part of the torque of the generator-motor 40 is transmitted to the first main shaft 4 from the idler shaft 8, via the auxiliary shaft 7 and the stepless transmission 20. After that, part of the transmitted torque is further transmitted to the carrier 34 via the sun gear 31, and the remaining torque is transmitted to the engine 3. In this state, by controlling the rotor rotational speed VR, as indicated by a solid line in FIG. 6(a), the rotational speed of the ring gear 32 is lowered from the state (shown by broken line in the figure) such that the rotational speed of the carrier 34 is marinated at the current value, before engagement of the clutch CL3 whereby the rotational speed of the sun gear 31 increases and the rotational speed of the crankshaft 3a integral with the sun gear 31, i.e. the engine speed NE also increases. In this state, according to the aforementioned crank angle position, the fuel injection valves and spark plugs (none of which are shown) of the engine 3 are controlled whereby the engine 3 is started.

Further, when the engine 3 is started, the torque of the generator-motor 40 is controlled such that torque is sufficiently transmitted to the drive wheels DW and DW and the engine 3. Further, when connecting the clutch CL3, the degree of engagement thereof is controlled to be progressively increased. This prevents the torque transmitted to the drive wheels DW and DW from suddenly dropping. Therefore, it is possible to secure excellent drivability. Further, the transmission ratio RATIO of the stepless transmission 20 is controlled according to the engine speed NE, the vehicle speed VR, the rotor rotational speed VR such that the relationship in rotational speed between the sun gear 31, the carrier 34, and the ring gear, which are determined by the gear ratios between the components is maintained.

Further, as indicated by a solid line in FIG. 6(b) (broken line in the figure: before engagement of the clutch CL3), even when the rotational speed of the carrier 34, i.e. the vehicle speed VP is relatively high, differently from the type in which the engine and the generator-motor are directly connected, it is possible to start the engine 3 while holding the rotational speed of the sun gear 31, i.e. the engine speed NE relatively low through the control of the aforementioned transmission ratio RATIO and the rotational speed of the rotor VR. Therefore, it is possible to suppress torque variation at the start of the engine 3 and vibrations and noise caused by the start of the engine 3, which makes it possible to improve marketability.

Next, a description will be given of the control during traveling of the vehicle after the start thereof. In this case as well, similarly to the case of the start of the engine 3, the electromagnetic brake CL2 is controlled to the OFF state, and at the same time the clutch C13 is engaged. Further, basically, the engine 3 alone is used as the drive source of the vehicle, and the power of the engine 3 is subjected to a speed change by the stepless transmission 20, and transmitted to the drive wheels DW and DW via the aforementioned first power transmission path. The operation of the engine 3 and the transmission ratio RATIO of the stepless transmission 20 are controlled according to the engine speed NE, the accelerator opening AP and so forth.

On the other hand, when one of the following conditions (a) and (b) is satisfied, the engine 3 is assisted by the generator-motor 40.

(a) demanded torque PMCMD>predetermined upper limit value PMH (a) remaining charge SOC>first predetermined value SOL The demanded torque PMCMD is a torque demanded of the vehicle, and is calculated according to the vehicle speed NE and the accelerator opening AP. The upper limit value PMH is set to a value slightly smaller than the upper limit toque that can be transmitted by the stepless transmission 20. The first predetermined torque SOCL is set to such a value as will not cause excessive discharge of the battery 46. Thus, the assist by the generator-motor 40 is carried out when the demanded torque PMCMD is close to the upper limit torque that can be transmitted by the stepless transmission 20 or when the remaining electric power of in the battery 46 is large enough.

During assist by the generator-motor 40, as shown in FIG. 7, the torque of the generator-motor 40 is transmitted to the carrier 34 via the ring gear 32. Accordingly, part of the torque of the engine 3 transmitted to the stepless transmission 20 is extracted, such that the torque is balanced between the sun gear 31 and the ring gear 32 via the carrier as a fulcrum, and is transmitted to the carrier 34 via the sun gear 31. Thus, the combined torque formed by combining the torque of the generator-motor 40 and part of the torque of the engine 3 is transmitted to the carrier 34.

Further, the combined torque and the remaining torque of the engine 3 remaining after transmitted to the stepless transmission 20 is combined by the idler shaft 8, and then transmitted to the drive wheels DW and DW. As a result, the torque transmitted to the drive wheels is equal to the torque of the engine 3 and the driving equivalent torque TSE. Further, the outputs from the engine 3 and the generator-motor 30 are controlled such that the optimum efficiency is obtained within a range within which the demanded torque PMCMD can be generated.

Further, the transmission ratio RATIO of the stepless transmission 20 is controlled in the following manner: First, the target engine speed NECMD and the target rotor rotational speed VRCMD are calculated by searching a NECME map and a VRCMD map (neither of which is shown) according to the demanded torque PMCMD and the vehicle speed VP. In these maps, the NECMD value and the VRCMD value are set such that with respect to the demanded torque PMCMD and the vehicle speed VP at the time, the optimum efficiencies of the engine 3 and the generator-motor 40 are obtained, and relationship in rotational speed between the sun gear 31, the carrier 34, and the ring gear, which are determined by the gear ratios between the components is maintained. Then, the transmission ratio RATIO is controlled such that the engine speed NE and the rotor rotational speed VR are become equal to the calculated NECMD value and VRCMD value.

On the other hand, if both the following equations (c) and (d) are satisfied, by controlling the PDU 45, the generator-motor 40 generates electric power, and the generated electric power is stored in the battery 46. This power generation is performed using the power of the engine 3 transmitted to the generator-motor 40 via the stepless transmission 20, the idler shaft 8, the second main shaft 6, the carrier 34, and ring gear 32. Hereinafter, the power generation is referred to as "drive-time power generation").

(C) demanded torque PMCMD≦predetermined upper limit value of electric power that can be generated (d) remaining charge SOC<second predetermined value SOCH The predetermined upper limit value of electric power that can be generated is set to a value smaller than the aforementioned upper limit value PMH. The second predetermined value SOCH is set to a such value as will not cause excessive charge of the battery 46. That is, the drive-time power generation is performed when the demanded torque PMCMD and the remaining charge SOC are relatively small.

As shown in FIG. 8, during the drive-time power generation, as part of the torque of the engine 3 is transmitted to the generator-motor 40 via the carrier 34 and the ring gear 32, torque of the torque of the engine 3 is also transmitted to the sun gear 31 via the carrier 34 such that the torque is balanced between the ring gear 32 and the sun gear 31. That is, torque of the engine transmitted to the carrier 34 is distributed to the generator-motor 40 and the sun gear 31.

Further, combined torque formed by combining torque distributed to the sun gear 31 as described above and the torque of the engine 3 is transmitted to the stepless transmission 20. Further, torque transmitted to the drive wheels DW and DW has a magnitude equal to a value obtained by subtracting the total sum of torque distributed via the carrier 34 to the generator-motor 40 and the sun gear 31, that is, a value obtained by subtracting the torque transmitted to the generator-motor 40 from the torque of the engine 3.

Further, the transmission ratio RATIO of the stepless transmission 20 is controlled in the same manner as controlled during assist. In the present case, however, different maps from those used during assist are used for searching the target engine speed NECMD and the target rotor rotational speed VRCMD.

FIG. 9 is a diagram showing a ratio of the torque transmitted to the drive wheels DW and DW and the stepless transmission 40 to the torque TENG of the engine 3 (hereinafter referred to as "the engine torque") generated by the combustion of the mixture supplied to the engine during assist and drive-time generation by the generator-motor 40, while holding constant the engine torque TENG. As shown in FIG. 19, during assist, torque TDRDW transmitted to the drive wheels DW and DW during assist (hereinafter referred to as "foot axis drive torque") is equal to the sum of the engine torque TENG and the torque TAS of the generator-motor 40 (hereinafter referred to as "assist torque") and becomes larger as the assist torque TAS value becomes larger.

Further, as described hereinbefore, as the assist torque TAS is transmitted to the carrier 34, part of the engine torque TENG transmitted to the stepless transmission 20 is extracted such that the torque is balanced between the ring gear 32 and the sun gear 31 and transmitted to the carrier 34 via the sun gear 31 (hereinafter, the torque extracted from the engine torque is referred to as "the extracted torque"). Therefore, as shown in FIG. 9, the torque TCA transmitted to the carrier 34 (hereinafter referred to as "carrier transmission torque") becomes larger as the assist torque TAS is larger. Further, as the assist torque TAS is larger, the extracted torque becomes larger, and hence the torque transmitted to the stepless transmission 20 (hereinafter referred to as "the CVT transmission torque") becomes smaller.

In FIG. 9, hollow arrows A and B represent the foot axis drive torque TDRDW and the CVT transmission torque TCVT at the maximum output of the vehicle, respectively. The engine torque TENG is directly transmitted to the stepless when the stepless transmission 2 is directly connected to the engine 3. According to the present embodiment, however, it is possible to reduce the CVT transmission torque TCVT by the aforementioned extracted torque as represented by a hollow arrow C in FIG. 9.

Further, as shown in FIG. 9, during the drive-time power generation, the foot axis drive torque TDRDW has a magnitude equal to a value obtained by subtracting torque (hereinafter referred to as "power generation torque") TEM transmitted according to the power generation to the generator-motor 40 from the engine torque TENG, and as the power generation torque TEM is larger, i.e. as the amount of generated electric power is larger, it becomes smaller. Further, as described hereinabove, the carrier transmission torque TCA is distributed to the generator-motor 40 and the sun gear 31, and hence the carrier transmission torque TCA becomes larger as the power generation torque TEM is larger. Further, since the combination torque formed by combining the torque distributed to the sun gear 31 and the engine torque TENG is transmitted the stepless transmission 20, and as the power generation torque TEM is larger, the torque distributed to the sun gear 31 becomes larger, the CVT transmission torque TCVT becomes larger as the power generation torque TEM is larger. Further, hollow arrows D and E in FIG. 9 represent the foot axis drive torque TDRDW and the CVT transmission torque TCVT during the normal drive-time power generation.

Further, during the drive-time power generation, the power generation torque TEM, i.e. the amount of generated electric power is controlled to be within the predetermine upper limit value. Further, as is carried out when the demanded torque PMCMD is not higher than the upper limit of electric power that can be generated, and the PMEH value is configured such that the combined torque becomes slightly smaller than the upper limit of torque that can be transmitted by the stepless transmission 20 when the power generation torque TEM is equal to the predetermined upper limit value. From the above, during execution of the drive-time power generation, it is possible to prevent the CVT transmission torque TCVT from exceeding the upper limit of torque, and hence it is possible to prevent failure of the stepless transmission 20 due to transmission of an excessively large torque.

Next, a description will be given of control during the decelerating travel of the vehicle. Similarly to the control at the start of the engine 3 and during the travel of the vehicle, the electromagnetic brake CL2 is controlled to the OFF state, and at the same time the clutch CL3 is engaged. Further, the power of the drive wheels DW and DW transmitted to the generator-motor 40 via the second power transmission path and the carrier 34 is converted into electric power and the generated electric power is supplied to the battery 46 to charge the same. Hereinafter, this generation is referred to as "the deceleration-time power generation".

As shown in FIGS. 10 and 11, during the deceleration-time power generation, the torque of drive wheels DW and DW transmitted to the carrier 34 is distributed to the ring gear 32 i.e. the generator-motor 40 and the sun gear 31, similarly to the case of the above-described drive-time power generation. FIG. 10 shows a case in which the ratio of the torque of the drive wheels DW and DW transmitted to the engine to the torque of the drive wheels DW and DW is small. In this case, as illustrated in the figure, all the torque TDW of the drive wheels DW and DW (hereinafter referred to as "the foot axis input torque") is transmitted to the carrier 34 via the second power transmission path, and part of the torque distributed to the sun gear 31, via the carrier 34 is further transmitted to the carrier 34 via the stepless transmission 20, the auxiliary shaft 7, the idler shaft 8, and the second main shaft 6. Thus, the combination torque formed by combining all the foot axis torque TDW and part of the torque distributed to the sun gear 31 is transmitted to the carrier 34. Further, the torque remaining after being distributed the sun gear 31 is transmitted to the engine 3. As a result, the total of torque transmitted to the generator-motor 40 and the engine 3 becomes equal to the foot axis input torque TDW.

Further, in the case where the ratio (TDRENG/TDW) of the foot axis input torque TDW (hereinafter referred to as "the engine drive torque TDRENG") transmitted to the engine 3 to the foot axis input torque TDW is larger, as shown in FIG. 11, part of the foot axis input torque TDW is transmitted to the carrier 34 via the second power transmission path, and the remainder of the foot axis input torque TDW is transmitted to the first main shaft 4 via the auxiliary shaft 7 and the stepless transmission 20. Further, the remainder of the foot axis input torque TDW transmitted to the first main shaft 4 is combined with the torque distributed to the sun gear 31, and then transmitted to the engine 3. As a consequence, the total of torque transmitted to the generator-motor 40 and the engine 3 become equal to the foot axis input torque TDW.

Further, the transmission ratio RATIO of the stepless transmission 20 is controlled in the same manner as during the above-described drive-time power generation.

FIG. 12 shows ratios of the engine drive torque TDRENG and the CVT transmission torque TCVT to the foot axis input torque TDW, assuming that the foot axis input torque TDW is constant during the deceleration-time power generation. In FIG. 12, a region α represents the case where the ratio of the engine drive torque TDRENG to the foot axis input torque TDW is small, and as described above, a combined torque formed by combining all of the foot axis input torque TDW and part of torque distributed to the sun gear 31 is transmitted to the carrier 34. Further, a region β represents the case where the ratio of the engine drive torque TDRENG to the foot axis input torque TDW is large, and as describe above, part of the foot axis input torque TDW is transmitted to the carrier 34.

As shown in FIG. 12, the power generation torque TEM is equal to the difference between the foot axis input torque TDW and the engine drive torque TDRENG, and becomes larger as the engine drive torque TDRENG is larger. Further, similarly to the case of the above-described drive-time power generation, as the power generation torque TEM is larger, the carrier transmission torque TCA becomes larger. Further, in the region α in FIG. 12, as described above, part of torque distributed to the sun gear 31 is transmitted to the stepless transmission 20, and hence as the part of torque distributed to the sun gear 31 is larger, i.e. as the power generation torque TEM is larger, the CVT transmission torque TCVT becomes larger. In this case, from the sun gear, i.e. from the engine 3 side, the torque is transmitted to the stepless transmission 20, and to indicate this, the CVT transmission torque TCVT is represented by negative values.

Further, in the region β in FIG. 12, part and the remainder of the foot axis input torque TDW are transmitted to the carrier 34 and the stepless transmission 20, respectively, and hence as the power generation torque TEM is larger, and as the carrier transmission torque TCA is larger, the CVT transmission torque TCVT becomes smaller. Further, when the carrier transmission torque TCA is equal to the foot axis input torque TDW (point P in FIG. 12), the CVT transmission torque TCVT becomes equal to a value of 0. Further, hollow arrows F and G in FIG. 12 represent the foot axis input torque TDW and the CVT transmission torque TCVT, during the normal deceleration-time power generation, respectively.

Further, the control during the decelerating travel of the vehicle may be carried out in the following manner: The clutch CL3 is disengaged, and at the same time, the engine speed NE is controlled to a value of 0. In this state, using the power of the drive wheels DW and DW, the generator-motor 40 may perform electric power generation. This makes it possible, as shown in FIG. 13, to transmit all the foot axis input torque TDW to the ring gear 32 using the sun gear 31 as a fulcrum, i.e. the generator-motor 40 via the second power transmission path and the carrier 34 without by way of the stepless transmission 20, and convert all the power of the drive wheels DW and DW into electric power, i.e. generate electric power.

Further, the above-described methods of starting the engine 3, creeping operation, and starting the vehicle may be replaced by the following methods: First, the start of the engine 3 will be described. Specifically, different from the above-described control at the start of engine, the electromagnetic brake CL2 is controlled to the ON state, to thereby hold the carrier 34 unrotatable, and the clutch CL3 is disengaged, while rotating the rotor 42 of the generator-motor 40. As described hereinabove, as shown in FIG. 14, the torque of the generator-motor 40 is transmitted to the engine 3 via the ring gear 32, the planetary gear 33, and the sun gear 31. In this case, as shown in FIG. 15, by rotating the rotor 42 together with the ring gear 32 in a direction reverse to the direction of rotation of the crankshaft 3a, the sun gear 31 is caused to rotate together with the crankshaft 3a in the same direction as the direction of rotation of the crankshaft 3a. In this state, the fuel injection valves and the spark plugs of the engine 3 are controlled to thereby control the start of the engine 3.

The control during the creeping operation is carried out following the above-describe start of the engine 3 in the following manner: The electromagnetic brake CL2 is controlled to the OFF state to make the carrier 34 rotatable, and the clutch CL3 is disengaged, while converting part of the power of the engine 3 transmitted to the generator-motor 40 via the ring gear 32 into electric power to thereby generate electric power.

Along with the power generation, brake torque commensurate with the amount of generated electric power acts on the ring gear 32 which rotates in an direction opposite to the direction of ration of the crankshaft 3a. The brake torque acts as a reaction force, whereby part of the engine torque TENG is transmitted to the carrier 34 using the ring gear 32 as a fulcrum, and at the same time, and acts to cause the carrier 34 to rotate in the same direction as the direction of rotation of the crankshaft 3a. Further, as shown in FIG. 16, the engine torque transmitted to the carrier 34 is then transmitted to the drive wheels DW and DW via the second power transmission path to act on the drive wheels DW and DW in a manner causing them to rotate in the normal direction. Further, the amount of generated electric power is controlled such the rotational speed of the carrier 34 becomes very small, whereby the creep operation is performed.

As described above, in the creep operation, part of the engine torque TENG is transmitted to the drive wheels DW and DW, it is possible to prevent the large reaction from the drive wheels DW and DW from acting on the engine 3, and therefore, it is possible to perform creep operation without causing engine stall. It should be noted that the creep operation using the power of the engine is mainly carried out when the remaining charge SOC is small or when ascending a slope.

The control at the start of the vehicle is carried out following the above-described creep operation in the following manner: The electromagnetic brake CL2 and the clutch CL3 are controlled similarly to the above-described operation, and at the same time the amount of electric power generated by the generator-motor 40 is increased to thereby control the rotational speed of the ring gear 32 in a direction reverse to the direction of rotation of the crankshaft 3a to a value of 0. Then, when the rotational speed of the ring gear 32 becomes equal to 0, the electric power is supplied to the generator-motor 40, and the ring gear 32 is caused to rotate in the direction of rotation of the crankshaft 3a (see a solid line in FIG. 17). As a result, as shown in FIG. 18, the torque of the generator-motor 40 and the torque of the engine 3 are combined by the carrier 34, and then the combined torque is transmitted to the wheels DW and DW via the second power transmission path. From the above, as shown in the solid line in FIG. 17, the rotational speed of the carrier 34 rises from the state having been equal to substantially 0 (broken line in FIG. 18) to cause the vehicle to make a standing start. In this case, the torque of the generator-motor 40 is controlled such that it is balanced with engine torque TENG. Then, after the vehicle speed VP has appropriately increased, the clutch CL3 is engaged, to perform the above-described control during travel of the vehicle.

As described above, according to the present embodiment, the generator-motor 40 and the drive wheels DW and DW are connected to each other via the first power transmission path including the ring gear 32, the planetary gears 33, the sun gear 31, and the stepless transmission 20, and via the second power transmission path which do not include the ring gear 32, the planetary gear 33, the carrier 34, or the stepless motor 20. As a consequence, compared with the conventional cases in which the power transmission between the generator-motor and the drive wheels is necessarily performed via the transmission, it is possible, to suppress power transmission loss at the stepless transmission 20. Therefore, it is possible to further increases the drive efficiency of driving the drive wheels DW and DW by the generator-motor 40, and the power generation efficiency using power of the drive wheels DW and DW.

For example, as already described with reference to FIGS. 3 and 13, when only the generator-motor 40 is used as a drive source, or when the deceleration-time power generation is performed, by disengaging the clutch CL3, the power transmission between the generator-motor 40 and the drive wheels DW and DW can be carried out only via the second power transmission path and the carrier 34, the planetary gears 33, and ring gear 32, i.e. quite without by way of the stepless transmission 20. Therefore, it is possible to totally prevent power transmission loss at the stepless transmission 20, and further increase the drive efficiency and the power generation efficiency of the generator-motor 40.

Further, during assist by the generator-motor 40, the transmission ratio RATIO of the stepless transmission 20 is controlled such that the engine speed NE and the rotor rotational speed VR become equal to the NECMD value and the VRCMD value which are set to enable the optimum efficiencies of the engine 3 and the generator-motor 40 to be obtained. This makes it possible to drive the drive wheels DW and DW while controlling the outputs from the engine 3 and the generator-motor 40 such that the optimum efficiencies thereof can be obtained. Therefore, it is possible to increase the drive efficiency of the power plant 1 as a whole.

Further, during assist, power corresponding to the extracted torque can be transmitted to the drive wheels DW and DW without by way of the stepless transmission 20, and hence it is possible to avoid power transmission loss at the stepless transmission 20 to thereby further increase the drive efficiency of the power plant 1 in its entirety. Further, it is possible to reduce the CVT transmission torque TCVT, by torque corresponding to the extracted torque, and hence, by employing a stepless transmission adapted to the reduced CVT transmission torque TCVT, it is possible to attain the high efficiency and reduced size of the stepless transmission 20, which then makes it possible to attain further improvement of the drive efficiency of the power plant 1 in its entirety and the reduction of the size thereof.

Further, the one-way clutch CL1 prevents the sun gear 31 connected to the crankshaft 3a from operating in a direction reverse to the direction of rotation of the crankshaft 3a. Therefore, as described hereinabove with reference to FIGS. 3 and 4, it is possible to properly drive the drive wheels DW and DW using the power of the generator-motor 40 without causing the reverse rotation of the crankshaft 3a together with the sun gear 31.

Further, as described with reference to FIGS. 14 and 15, while holding the carrier 34 unrotatable by the electromagnetic brake CL2, the clutch CL3 is disengaged, and the rotor 42 of the generator-motor 40 is caused to rotate in a direction reverse to the direction of rotation of the crankshaft 3a. This makes it possible to start the engine 3 by the generator-motor 40 without driving the drive wheels DW and DW.

It should be noted that the present invention is by no means limited to the embodiment described above, but can be practiced in various forms. For example, although in the embodiment, the first to third elements of the planetary gear train 30, i.e. the sun gear 31, ring gear 32, and carrier 34 are connected between the engine 3 and the stepless transmission 20, the generator-motor 40, and to the drive wheels DW and DW, respectively, this is not limitative, but the connecting relationship between the three elements of the planetary gear train 30 and components to which they are connected can be changed as desired.

For example, if one of the sun gear 31 and the ring gear 32 (hereinafter referred to as "the one gear") is connected to the generator-motor 40, the other thereof (hereinafter referred to as "the other gear") is connected to the drive wheels DW and DW, the carrier 34 to the engine 3 and the stepless transmission 20, respectively, during travel of the vehicle, when power generation is performed by the generator-motor 40 using power of the engine 3, it is possible to reduce the CVT transmission torque TCVT.

Specifically, when part of the engine torque TENG is transmitted to the generator-motor 40 via the one of the carrier 34 and the other gear, part of the engine torque TENG is also transmitted to the other gear via the carrier 34, such that the torque is balanced between the one gear and the other gear. Transmitted to the stepless transmission 20 is the remainder of the engine torque TENG which is obtained by subtracting therefrom the part of the engine torque TENG transmitted to the one gear and the other gear. Therefore, it is possible to reduce the CVT transmission torque TCVT during the power generation using the power of the engine 3.

Further, although in the present embodiment, the stepless transmission is used as the transmission, it is to be understood that a step-type transmission may be used. Further, although in the present embodiment, the clutch CL3 is disposed between the stepless transmission 20 and the drive wheels DW and DW, it may be disposed between the stepless transmission 20 of the first main shaft 4 and the sun gear 31. In this case, at the start of engine 3 during the travel of the vehicle described hereinabove with reference to FIG. 5, before the clutch 13 is engaged, differently from the present embodiment, power of the generator-motor 40 is transmitted to both pulleys of the stepless transmission 20 to cause rotation of the pulleys 21 and 22, and hence the transmission ratio RATIO can be controlled to a desired value while preventing the contact surfaces of the pulleys 21 and 22 and the transmission belt 23. In addition, at the start of the engine 3 during the stoppage of the vehicle which is described hereinabove with reference to FIG. 14, the engine 3 can be started without dragging the stepless transmission 20.

Further, in place of the one-way clutch according to the present embodiment, it is possible to use a brake mechanism formed by a hand brake or a wet multi-disc clutch, which prevents the sun gear 31 from rotating in a direction reverse to the direction of rotation of the crankshaft 3a. Moreover, in the present embodiment, the generator-motor 40 is integrally formed with the planetary gear train 30, the former may be formed separately from the latter. Further, according to the present embodiment, a control system for controlling the power plant 1 is implemented by the ECU 2 and the PDU 45, this is not limitative, but it may be implemented by an electric circuit on which a microcomputer is mounted. Moreover, although the present embodiment is an example of application thereof to an vehicle, this is not limitative, but it is applicable to tanks, submarines, aircrafts, and so forth. It is to be further understood that various changes and modifications may be made without departing from the spirit and scope thereof.

BRIEF DESCRIPTION OF THE DRAWINGS

[FIG. 6] A speed diagram showing an example of the rotational speeds of the sun gear, the carrier, and the ring gear, in respective cases of:

(a) the vehicle speed being relatively low; and (b) the vehicle speed being relatively high.

Figure 7:
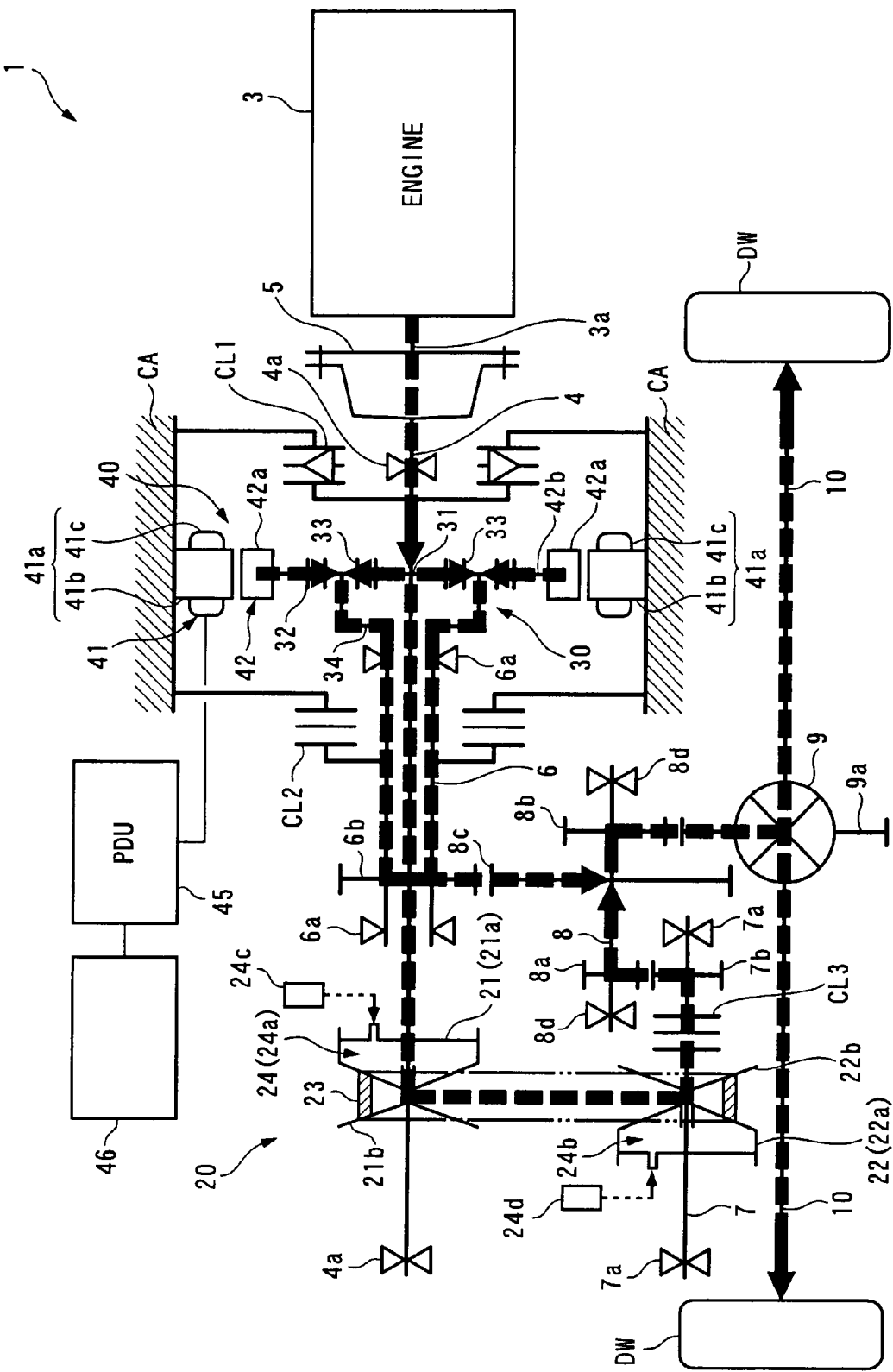

[FIG. 7] A diagram showing a state of transmission of torque in the power plant during assist.

Figure 8:
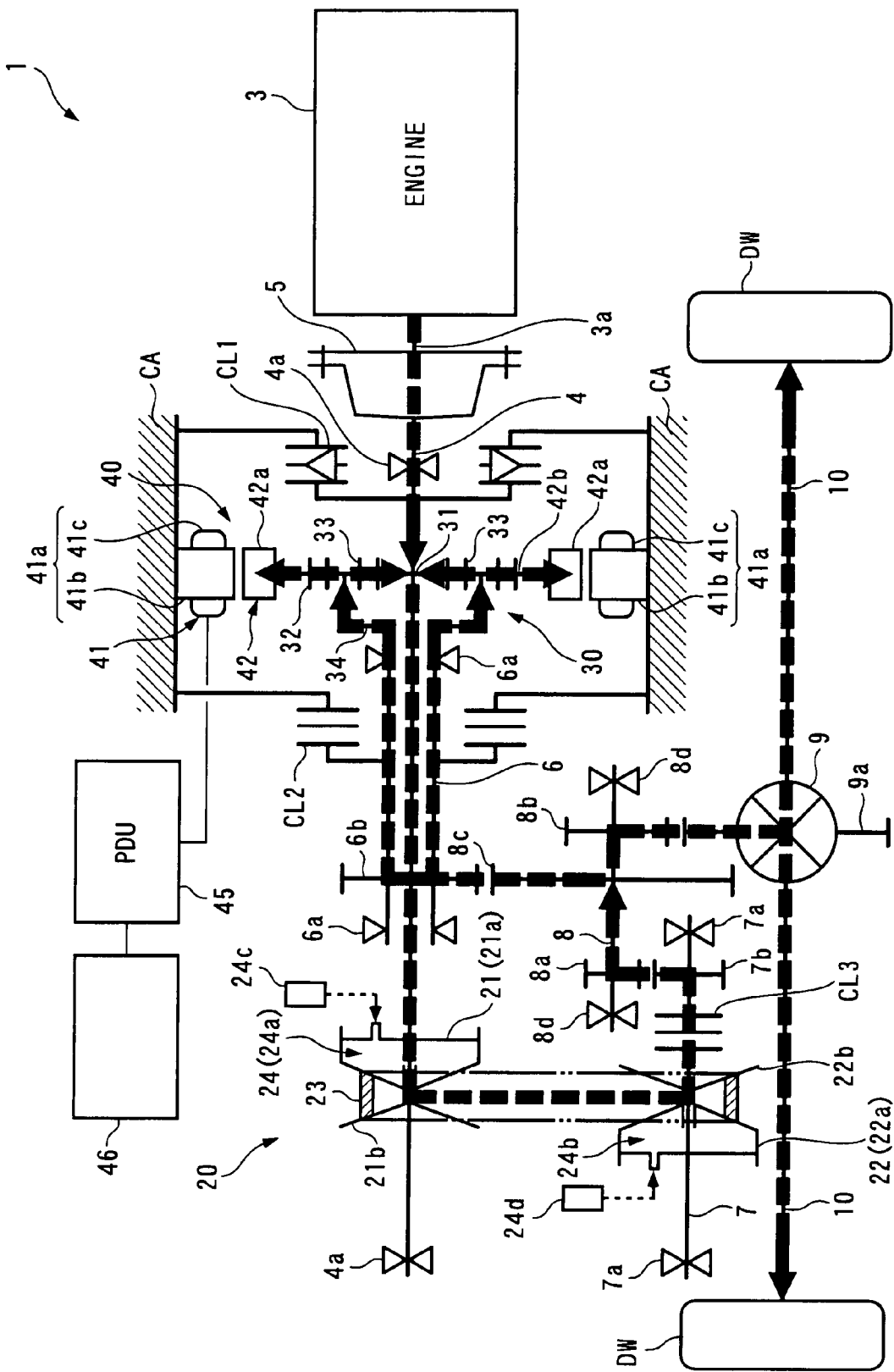

[FIG. 8] A diagram showing a state of transmission of torque in the power plant during drive-time power generation.

Figure 9:
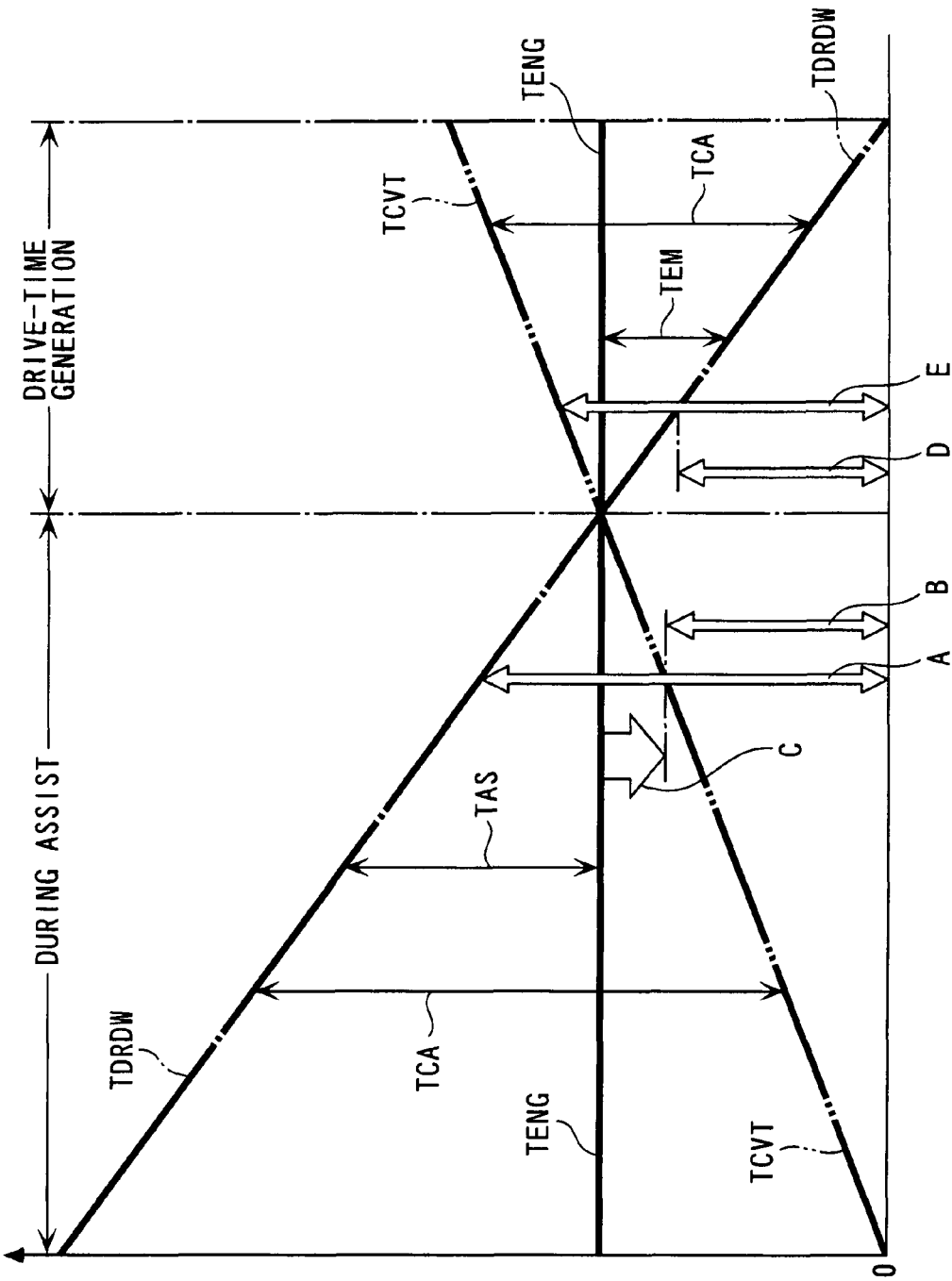

[FIG. 9] A diagram showing ratios of the foot axis drive torque TDRDW, the CVT transmission torque TCVT, and the like to the engine torque TENG, when holding the engine torque TENG constant during assist.

Figure 10:
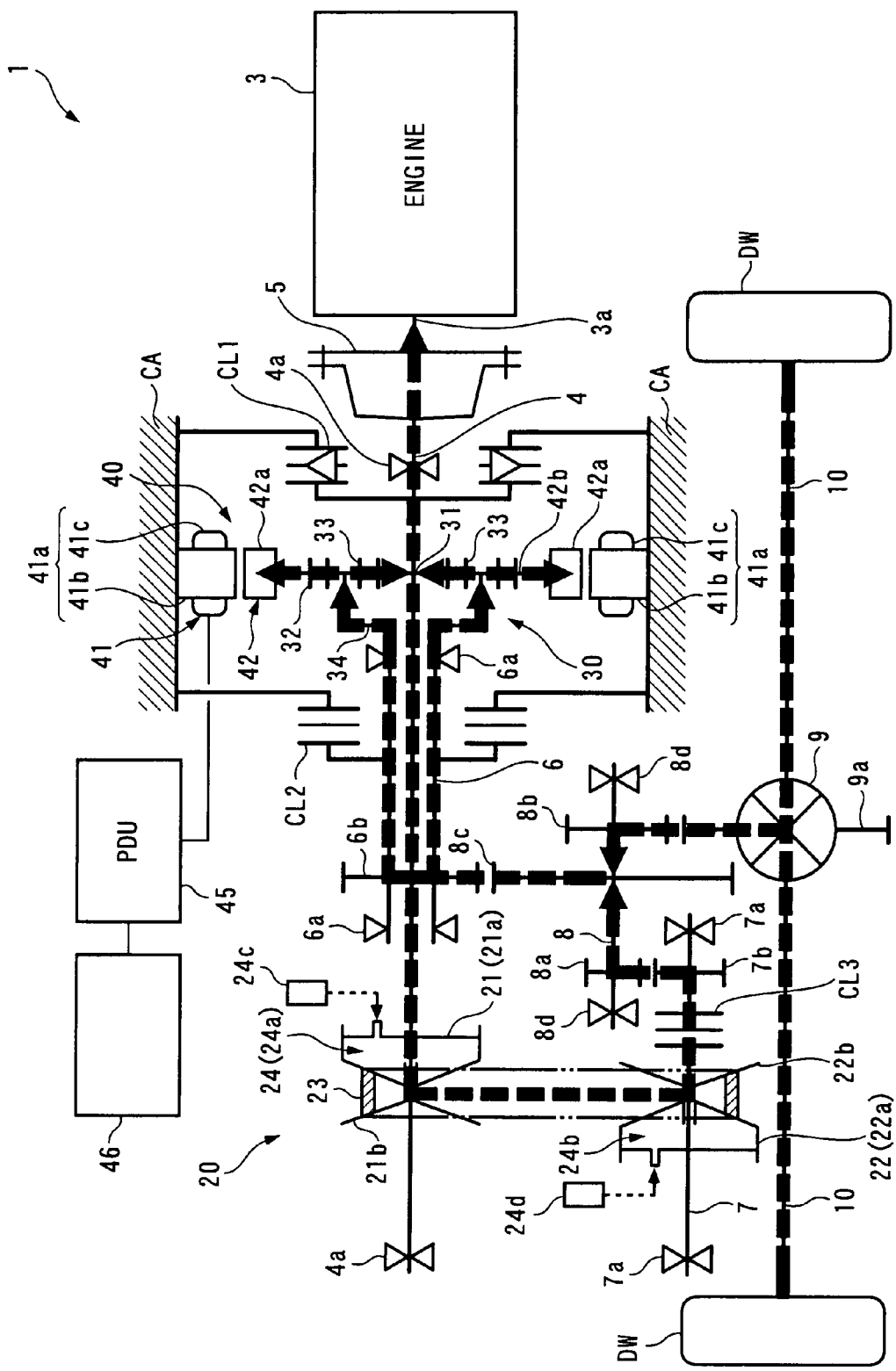

[FIG. 10] A diagram showing a state of transmission of torque in the power plant in the case where the ratio of the engine drive torque TDRENG to the foot axis input torque TDW is small during the deceleration-time power generation.

Figure 11:
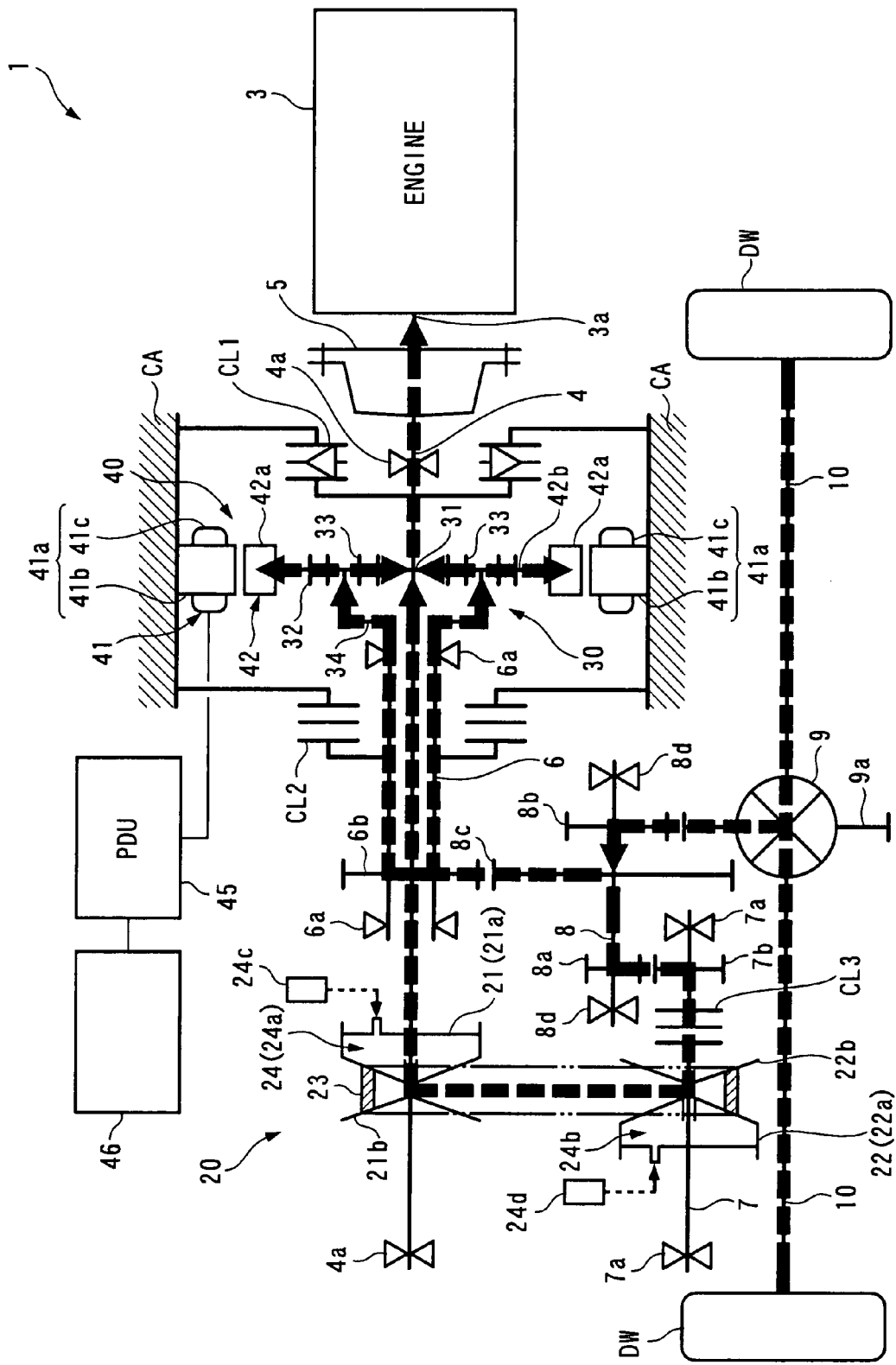

[FIG. 11] A diagram showing a state of transmission in the power plant in the case where the ratio of the engine drive torque TDRENG to the foot axis input torque TDW is large during the deceleration-time power generation.

Figure 12:
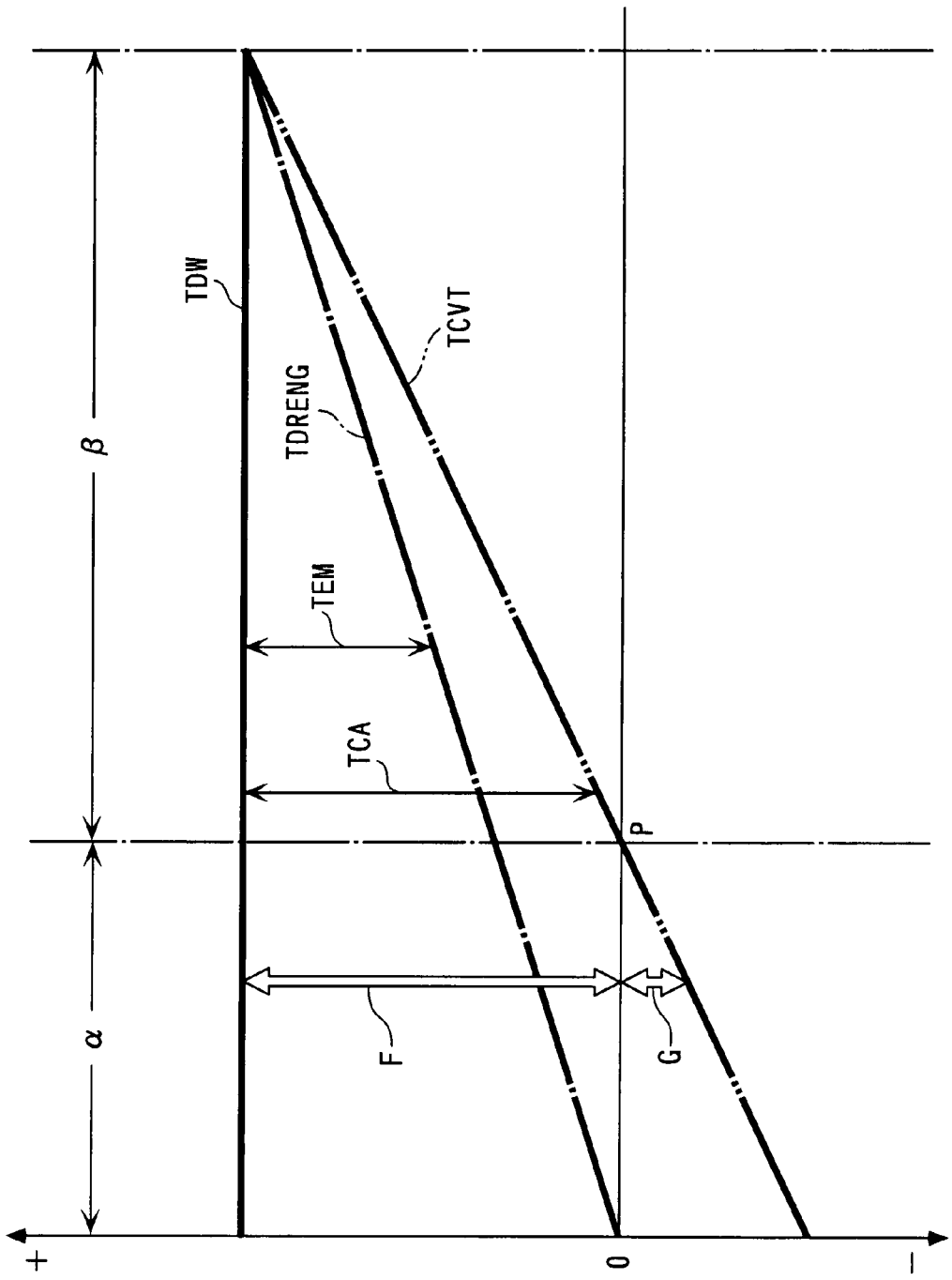

[FIG. 12] A diagram showing ratios of the engine drive torque TDRENG, the CVT transmission torque TCVT, and the like to the foot axis input torque TDW, while holding the foot axis input torque TDW constant during the deceleration-time power generation.

Figure 13:
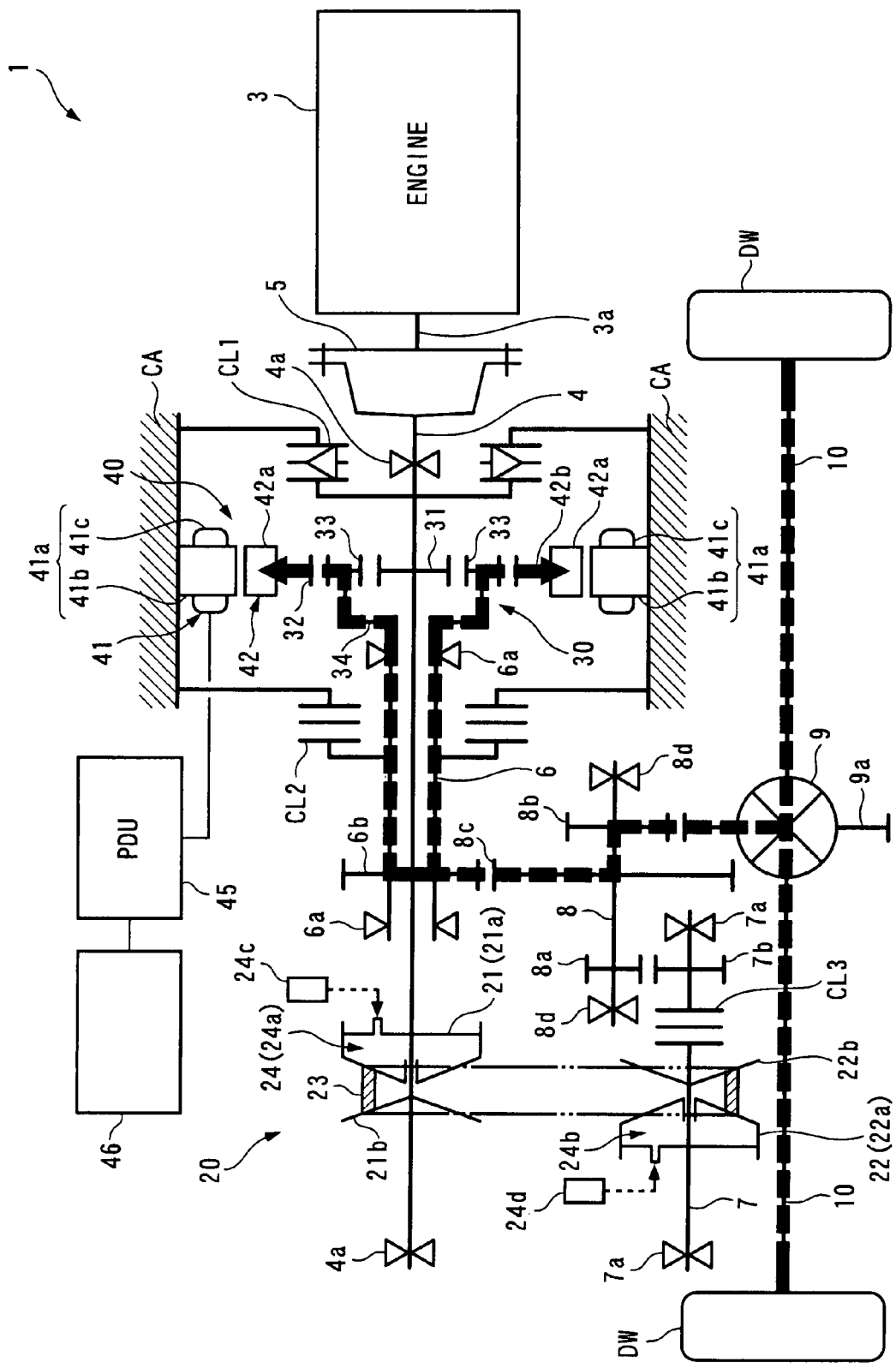

[FIG. 13] A diagram showing a state of transmission of torque in the power plant in the case where the clutch is disengaged and the engine speed is controlled to 0.

Figure 5:
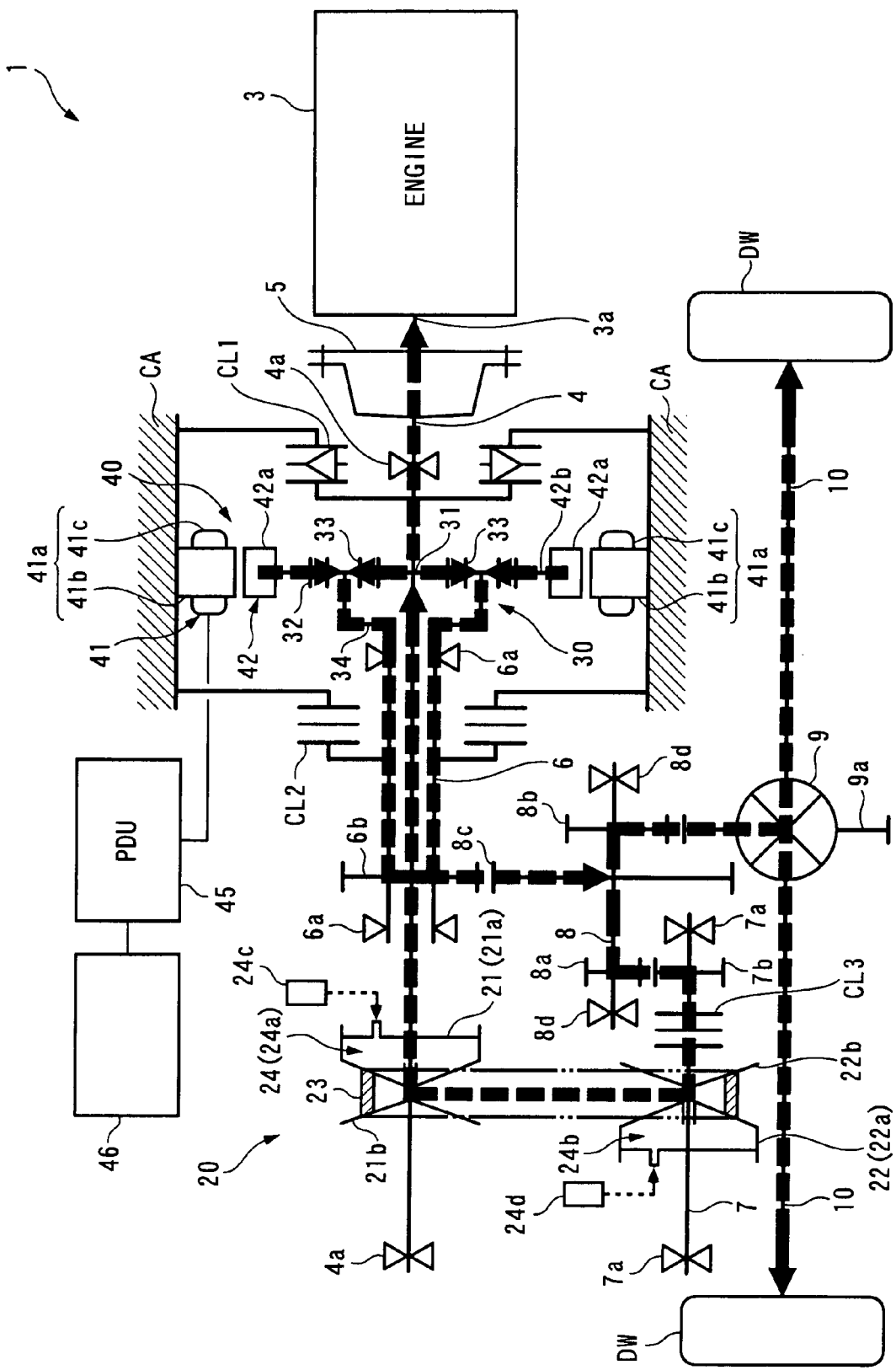
[FIG. 5] A diagram illustrating a state of transmission of torque in the power plant, at the start of the engine.
Figure 14:
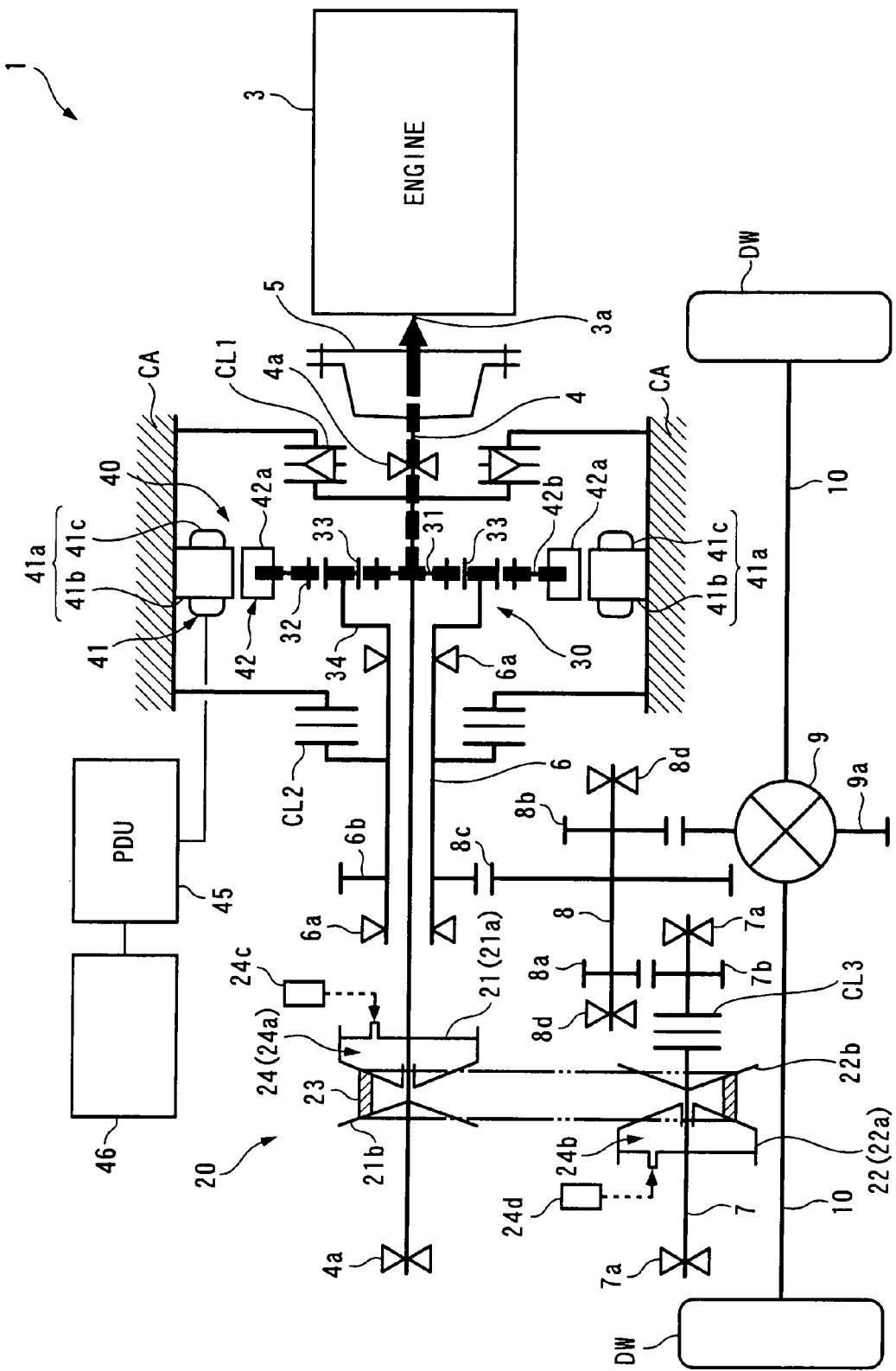

[FIG. 14] A diagram showing a state of transmission of torque in the power plant, in the case where the engine is started by a different method than employed in FIG. 5.

[FIG. 15] A speed diagram showing an example of the rotational speeds of the sun gear, the carrier, and the ring gear, in the case where the engine is started by the same method as in FIG. 14.

Figure 1:
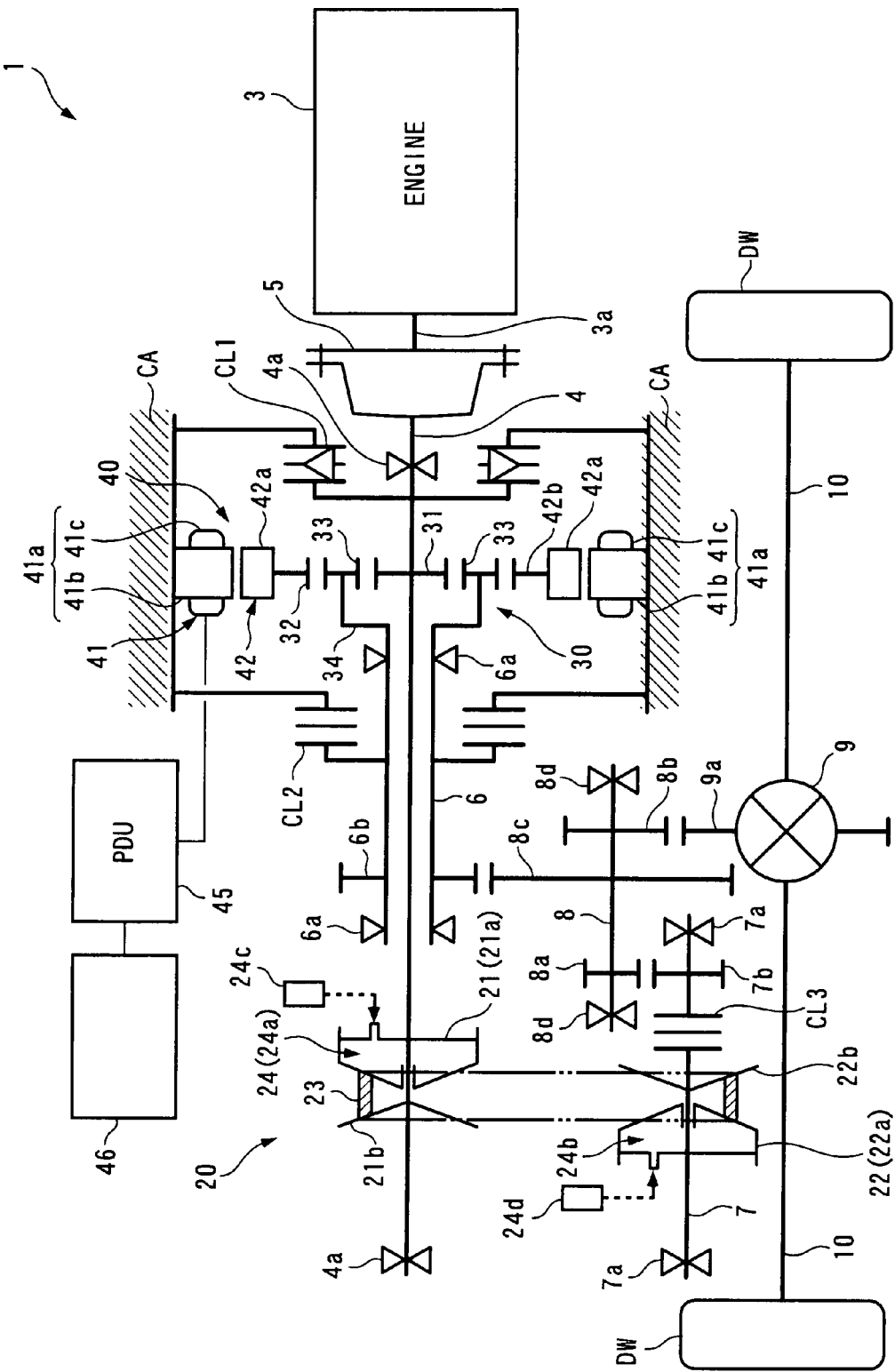
[FIG. 1] A schematic diagram of a power plant according to the present embodiment.
Figure 2:
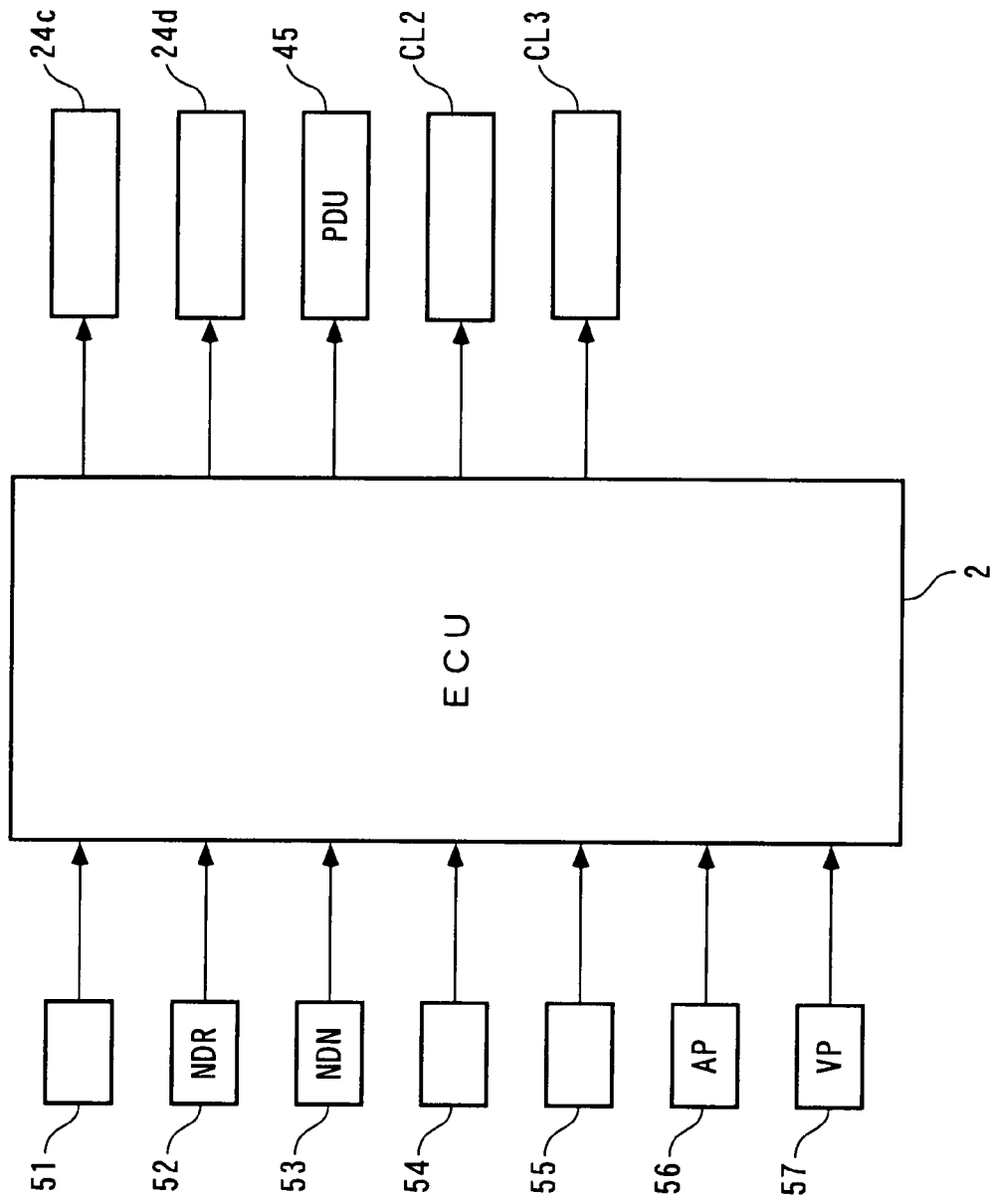
[FIG. 2] A block diagram of a control system for controlling the power plant.
Figure 3:
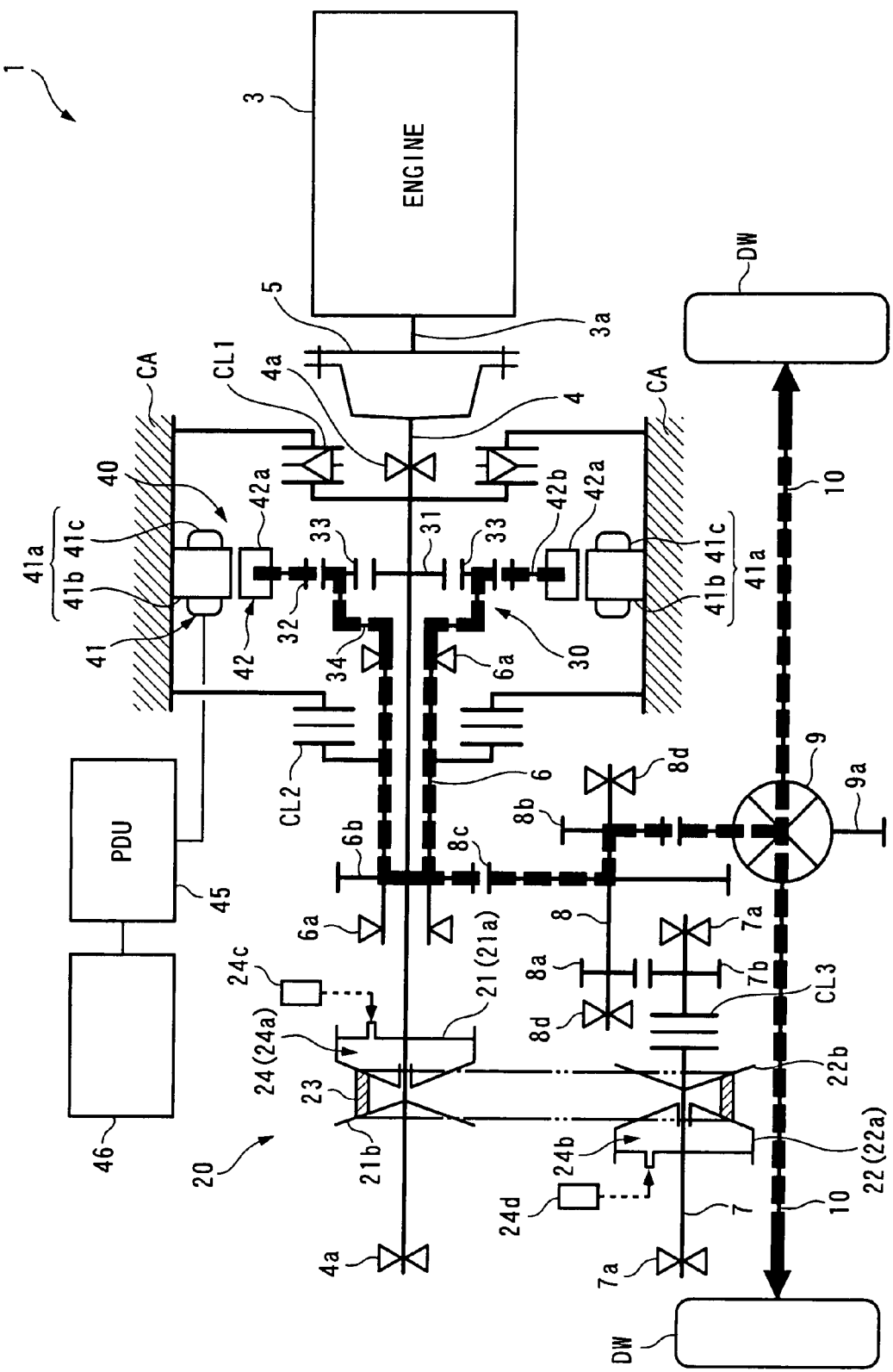
[FIG. 3] A diagram showing a state of transmission of torque at the power plant during the creep operation of the vehicle.
Figure 16:
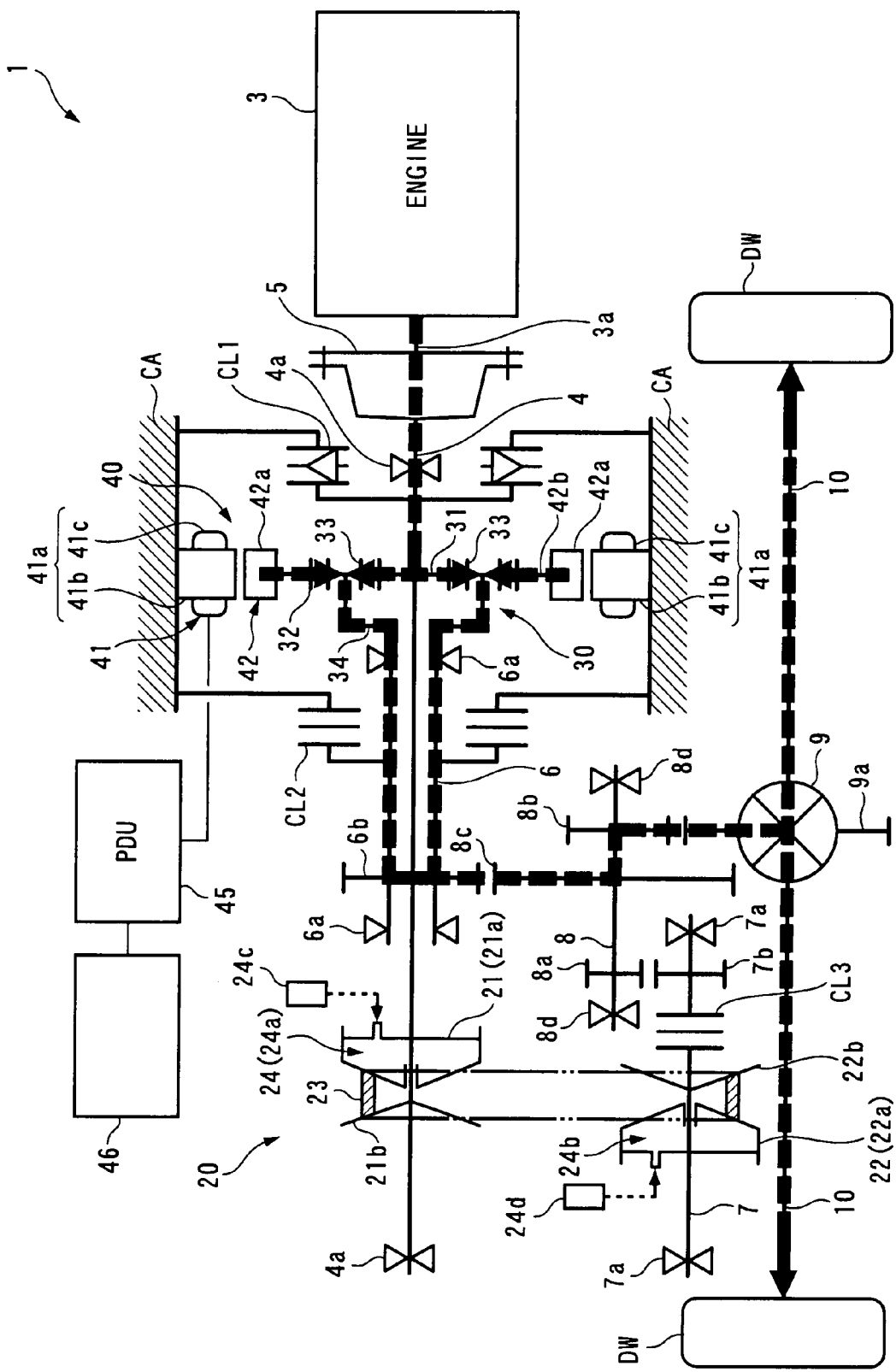

[FIG. 16] A diagram showing a state of transmission of torque in the power plant, in the case where the creep operation is performed by a different method than in FIG. 3.

Figure 4:
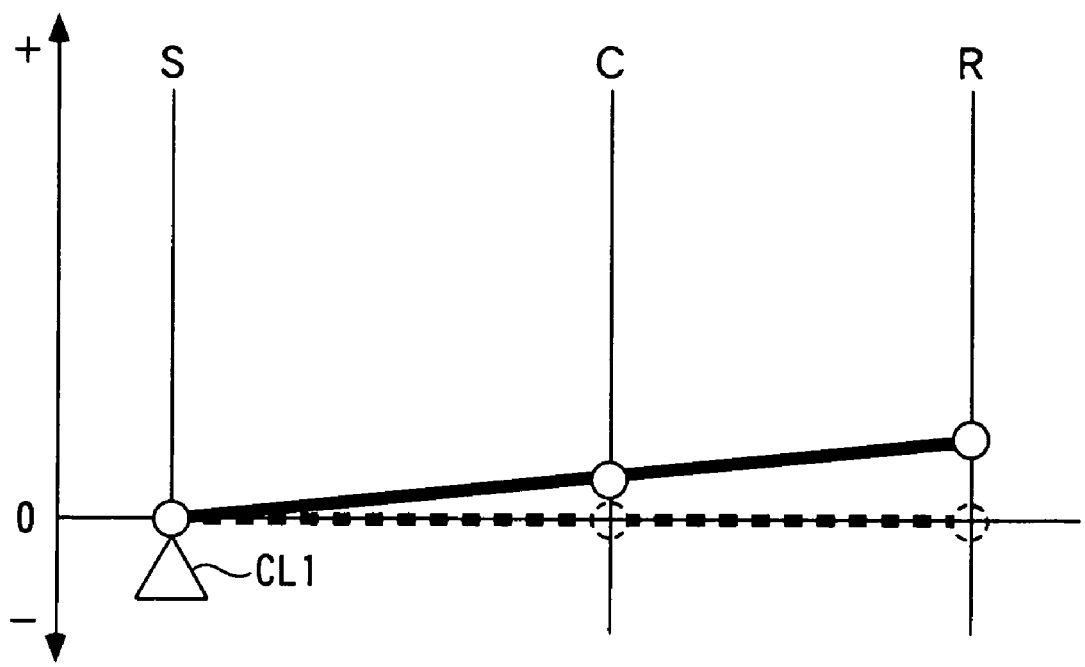
[FIG. 4] A speed diagram showing an example of the rotational speeds of the sun gear, the carrier, and the ring gear.

[FIG. 17] A speed diagram showing an example of the rotational speeds of the sun gear, the carrier, and the ring gear, in the case where the vehicle is started by a different method than in FIG. 4.

Figure 18:
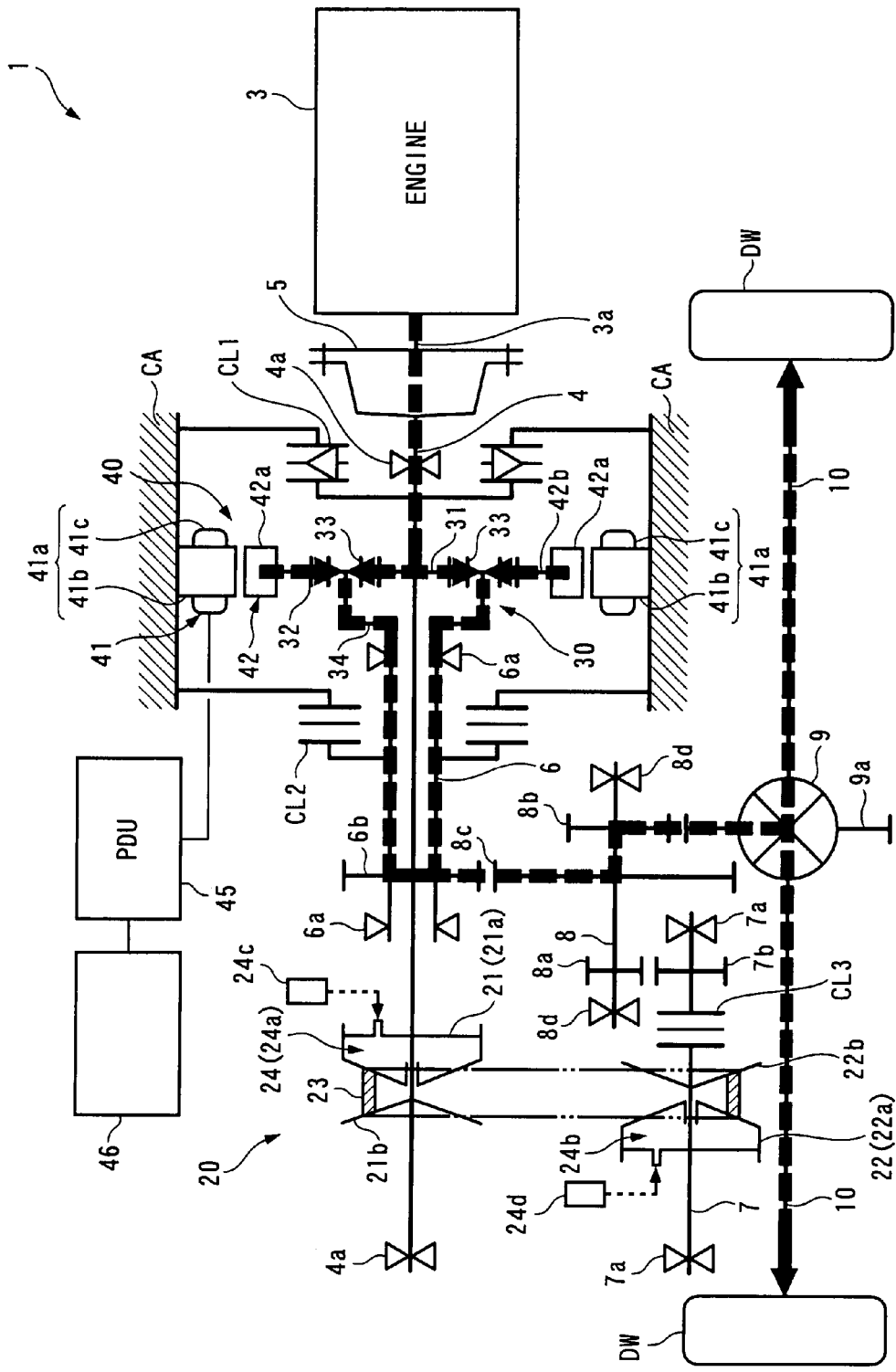

[FIG. 18] A diagram showing a state of transmission of torque in the power plant, in the case where the vehicle is started by the same method as in FIG. 17.

DESCRIPTION OF REFERENCE NUMERALS 1 power plant
3 engine
3a crankshaft (output shaft)
20 stepless transmission (transmission)
30 planetary gear train
31 sun gear (first element, second element, third element)
32 ring gear (first element, second element, third element)
33 planetary gear
34 carrier (first element, second element, third element)
40 generator-motor
42 rotor (output portion)
DW drive wheel (driven parts)
CL1 one-way clutch (brake mechanism)
CL2 electromagnetic brake (lock mechanism)
CL3 clutch

The invention claimed is:

1. A power plant for driving a driven part, comprising:
an engine comprising an output shaft, said output shaft operatively connected to said driven part;
a transmission operatively connected to said output shaft of said engine and said driven part for changing a speed of power of said engine and for transmitting said speed of power to said driven part;
a generator-motor comprising an output portion;
a planetary gear train comprising a first element, a second element, and a third element, one of said first element, said second element, and said third element being operatively connected between said output shaft of said engine and said transmission, another of said first element, said second element, and said third element being operatively connected to said output portion of said generator-motor, and a remaining one of said first element, said second element, and said third element being operatively connected to said driven part in parallel to said transmission;
a clutch for connecting and disconnecting a connection between one of said first element and said third element and said driven part; and
a lock mechanism configured to hold said second element unrotatable,
wherein one of said first element, said second element, and said third element is configured to rotatably support planetary gears in a mesh with the other two of said first element, said second element, and said third element,
wherein said first element of said planetary gear train comprises a sun gear, said second element comprises a carrier, and said third element comprises a ring gear, and
wherein one of said sun gear and said ring gear is operatively connected between said output shaft of said engine and said transmission, the other of said sun gear and said ring gear being operatively connected to said output portion of said generator-motor, and said carrier is operatively connected to said driven part.

2. The power plant of claim 1, wherein said engine comprises an internal combustion engine.

3. The power plant of claim 1, wherein said transmission is operatively connected between said engine and said driven part.

4. The power plant of claim 1, wherein said transmission comprises a stepless transmission configured to steplessly change a transmission ratio.

5. The power plant of claim 1, further comprising:
a clutch for connecting and disconnecting a connection between one of said first element, said second element, and said third element from said driven part.

6. The power plant of claim 1, wherein said one of said sun gear and said ring gear comprises a brake mechanism for limiting a rotation of one of said sun gear and said ring gear in a direction opposite to a direction of rotation of said output shaft of said engine.

7. A method of operating a power plant, comprising:
disengaging a first clutch for disconnecting a connection between an engine and a transmission, said transmission being operatively connected between an output shaft of said engine and a driven part;
rotating a first rotor of a generator motor in a predetermined direction, said generator motor comprising an output portion;
rotating a first element of a planetary gear train in said predetermined direction, said first element of said planetary gear train being operatively connected to said output portion of said generator motor;
rotating said output shaft of said engine in said predetermined direction, said output shaft being operatively connected to said driven part;
engaging a second clutch for preventing a second element of said planetary gear train from rotating in a direction opposite to said direction of rotation of said output shaft of said engine;
transmitting a torque of said generator motor using said second element as a fulcrum to a third element of said planetary gear train via said first element and a plurality of planetary gears for transmitting said torque to said driven part in parallel to said transmission;
connecting and disconnecting a connection between one of said first element and said third element and said driven part;
holding said second element unrotatable,
wherein said first element of said planetary gear train comprises a sun gear, said second element comprises a carrier, and said third element comprises a ring gear, and
wherein one of said sun near and said ring gear is operatively connected between said output shaft of said engine and said transmission, the other of said sun gear and said ring gear being operatively connected to said output portion of said generator-motor, and said carrier is operatively connected to said driven part.

8. The method of claim 7, wherein transmitting said torque further comprises transmitting said torque without said transmission.

9. The method of claim 7, further comprising:
rotating a second rotor in said predetermined direction for rotating said driven part in a normal direction.

10. The method of claim 7, further comprising:
increasing a rotational speed of said first element for increasing a rotational speed of said third element.

11. The method of claim 7, wherein transmitting said torque further comprises said third element being operatively connected to said driven part.

12. The method of claim 7, wherein disengaging further comprises said engine comprising an internal combustion engine.

13. The method of claim 7, wherein disengaging further comprises said transmission comprising a stepless transmission configured to steplessly change a transmission ratio.

14. A power plant for driving a driven part, comprising:
first drive means for driving a driven part of a hybrid vehicle, said first drive means comprising an output shaft operatively connected to said driven part;
speed control means for changing a speed of power of said first drive means and for transmitting said speed of power to said driven part, said speed control means being operatively connected between said output shaft of said first drive means and said driven part in parallel to said speed control means;
second drive means for generating a driving force on said driven part; said second drive means comprising an output portion;
gear means for transmitting said driving force from said first drive means, said second drive means, and said speed control means to said driven part, said gear means comprising a first element, a second element, and a third element; and
first clutch means for disconnecting a connection between said first drive means and said speed control means and for transmitting said driving force to said driven part via said first element and said third element of said gear means and a plurality of planetary gears without said speed control means; and
lock means for holding said second element unrotatable,
wherein said first element of said gear means comprises a sun gear, said second element comprises a carrier, and said third element comprises a ring gear, and
wherein one of said sun gear and said ring gear is operatively connected between said output shaft of said first drive means and said speed control means, the other of said sun gear and said ring gear being operatively connected to said output portion of said second drive means, and said carrier is operatively connected to said driven part.

15. The power plant of claim 14, wherein gear means for transmitting said driving force from said first drive means further comprises said first element being operatively connected between said output shaft of said first drive means and said speed control means; said second element being operatively connected to said output portion of said second drive means; and said third element being operatively connected to said driven part.

16. The power plant of claim 14, further comprising
second clutch means for preventing said second element of said gear means from rotating in a direction opposite to said direction of rotation of said output shaft of said first drive means.

17. The power plant of claim 14, further comprising
a rotation means for rotating said driven part in a normal direction.

* * * * *